(12) United States Patent
Li et al.

(10) Patent No.: US 11,442,264 B2
(45) Date of Patent: Sep. 13, 2022

(54) ELECTROWETTING DEVICE

(71) Applicant: SHARP KABUSHIKI KAISHA, Sakai (JP)

(72) Inventors: Hao Li, Sakai (JP); Tomoko Teranishi, Sakai (JP); Tomohiro Kosaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 352 days.

(21) Appl. No.: 16/829,981

(22) Filed: Mar. 25, 2020

(65) Prior Publication Data

US 2020/0310106 A1     Oct. 1, 2020

Related U.S. Application Data

(60) Provisional application No. 62/824,831, filed on Mar. 27, 2019.

(51) Int. Cl.
*G02B 26/00* (2006.01)

(52) U.S. Cl.
CPC ......... *G02B 26/005* (2013.01); *G02B 26/002* (2013.01)

(58) Field of Classification Search
CPC ... G02B 26/004; G02B 26/005; G02B 26/002
See application file for complete search history.

(56) References Cited

U.S. PATENT DOCUMENTS

2020/0241283 A1* 7/2020 Shibata ................ G02B 26/005

FOREIGN PATENT DOCUMENTS

WO     2017/078059 A1     5/2017

* cited by examiner

*Primary Examiner* — Joseph P Martinez
(74) *Attorney, Agent, or Firm* — ScienBiziP, P.C.

(57) ABSTRACT

An electrowetting device includes an electrode substrate including a first substrate, a plurality of first drive electrodes formed on the first substrate, and a water-repellent insulating layer formed on the plurality of first drive electrodes, a counter substrate including a second substrate, and disposed so as to face the electrode substrate with a predetermined gap therebetween, a sealing portion provided in a sealing region at the electrode substrate, and bonding the electrode substrate and the counter substrate, and an injection valve for injecting a droplet into the gap, the injection valve being located in the sealing region and including a first valve body formed of an electric field responsive gel.

16 Claims, 22 Drawing Sheets

ELECTROWETTING DEVICE

CROSS-REFERENCE TO RELATED APPLICATION

The present application claims priority from Provisional Application 62/824,831, the content to which is hereby incorporated by reference into this application.

BACK GROUND OF THE INVENTION

1. Field of the Invention

The present disclosure relates to an electrowetting device.

2. Description of the Related Art

In recent years, a development of an electrowetting device (also referred to as microfluidic device or droplet device) is being carried out. Electrowetting is a phenomenon in which, when an electric field is applied to a droplet placed on a water-repellent dielectric layer provided on an electrode, a contact angle of the droplet with respect to the dielectric layer changes. By utilizing electrowetting, it is possible to manipulate very small droplets, for example, sub-microliters. In English, the electrowetting device is often referred to as Electrowetting on Dielectric Devices (EWOD), and thus may be hereinafter referred to as "EWOD" for simplicity.

International Publication No. 2017/078059 discloses an electrowetting device provided with an upper substrate and a lower substrate. The upper substrate is provided with an injection hole for injecting a non-conductive liquid such as silicone oil or a droplet into a gap formed between the upper substrate and the lower substrate. The upper substrate and the lower substrate are, for example, glass substrates.

SUMMARY OF THE INVENTION

The manufacture of an electrowetting device provided with an upper substrate having an injection hole requires, for example, a step of opening a hole in the substrate using machining such as drilling, or a glass processing technique such as laser processing or wet etching, which results in an increase in manufacturing cost. Further, there is a quality problem that a crack can be generated around the hole starting from the hole. Therefore, it is desired to improve these quality aspects and to reduce the manufacturing cost.

The present disclosure has been made in view of the above problems, and an object thereof is to provide an electrowetting device capable of improving quality without requiring a step of opening a hole in the substrate.

The present disclosure discloses the electrowetting device described in the following items.

[Item 1]
An electrowetting device including an electrode substrate including a first substrate, a plurality of first drive electrodes formed on the first substrate, and a water-repellent insulating layer formed on the plurality of first drive electrodes, a counter substrate including a second substrate, and disposed so as to face the electrode substrate with a predetermined gap therebetween, a sealing portion provided in a sealing region at the electrode substrate, and bonding the electrode substrate and the counter substrate, and at least one injection valve for injecting a droplet into the gap, the injection valve being located in the sealing region and including a first valve body formed of an electric field responsive gel.

[Item 2]
The electrowetting device according to Item 1, in which the injection valve includes the first valve body and an injection valve electrode pair for sandwiching at least a part of the first valve body and applying a voltage to the first valve body, and the injection valve electrode pair includes a first injection valve electrode wholly or partially located in an inner region inside the sealing region at the electrode substrate.

[Item 3]
The electrowetting device according to Item 1 or 2, further including an exhaust valve for taking out air in the gap, the exhaust valve being located in the sealing region, and including a second valve body formed of an electric field responsive gel.

[Item 4]
The electrowetting device according to Item 3, in which the exhaust valve includes the second valve body and an exhaust valve electrode pair for sandwiching at least a part of the second valve body and applying a voltage to the second valve body, the exhaust valve electrode pair includes a first exhaust valve electrode wholly or partially located in the inner region, and the first injection valve electrode and the first exhaust valve electrode are electrically connected to a first terminal electrode via a first wiring line.

[Item 5]
The electrowetting device according to Item 4, in which the electrode substrate further includes the first terminal electrode for externally supplying a desired control signal for controlling opening/closing of the injection valve and the exhaust valve, and the first injection valve electrode and the first exhaust valve electrode are electrically connected to the first terminal electrode via the first wiring line.

[Item 6]
The electrowetting device according to Item 4 or 5, in which the electrode substrate further includes a second terminal electrode different from the first terminal electrode, for externally supplying a desired control signal for controlling opening/closing of the injection valve and the exhaust valve, the injection valve electrode pair includes the first injection valve electrode and a second injection valve electrode located in an outer region outside the sealing region at the electrode substrate, and the first injection valve electrode and the second injection valve electrode sandwich a part of the first valve body, the exhaust valve electrode pair includes the first exhaust valve electrode and a second exhaust valve electrode located in the outer region, and the first exhaust valve electrode and the second exhaust valve electrode sandwich a part of the second valve body, and the second injection valve electrode and the second exhaust valve electrode are electrically connected to the second terminal electrode via a second wiring line.

[Item 7]
The electrowetting device according to Item 4 or 5, in which the counter substrate further includes a second terminal electrode different from the first terminal electrode, for externally supplying a desired control signal for controlling opening/closing of the injection valve and the exhaust valve, the injection valve electrode pair includes the first injection valve electrode and a second injection valve electrode located in a sealing region at the counter substrate, and in a direction normal to the electrode substrate, the first injection valve electrode and the second injection valve electrode sandwich a part of the first valve body, the exhaust valve electrode pair includes the first exhaust valve electrode and a second exhaust valve electrode located in the sealing region at the counter substrate, and in the direction normal to the electrode substrate, the first exhaust valve electrode and the second exhaust valve electrode sandwich a part of the second valve body, and the second injection valve electrode and the second exhaust valve electrode are electrically connected to the second terminal electrode via a second wiring line.

[Item 8]

The electrowetting device according to Item 6 or 7, in which the at least one injection valve includes a plurality of injection valves, and the plurality of injection valves are disposed along a column direction, and a part of the sealing portion is present between the first valve bodies of two of the plurality of injection valves adjacent to each other.

[Item 9]

The electrowetting device according to Item 7, in which the at least one injection valve includes a plurality of injection valves, and the plurality of injection valves are disposed along a column direction, and the first valve bodies of two of the plurality of injection valves adjacent to each other are in contact with each other when the injection valves are closed.

[Item 10]

The electrowetting device according to any one of Items 4 to 9, in which each of the first valve body and the second valve body is formed of a polyvinyl chloride gel.

[Item 11]

The electrowetting device according to any one of Items 4 to 10, in which an area of the second injection valve electrode is smaller than an area of the first injection valve electrode, and an area of the second exhaust valve electrode is smaller than an area of the first exhaust valve electrode.

[Item 12]

The electrowetting device according to any one of Items 4 to 11, in which the injection valve is opened by applying a positive voltage to the first injection valve electrode of the injection valve electrode pair and applying a negative or zero voltage to the second injection valve electrode of the injection valve electrode pair, and the injection valve is closed by applying a negative or zero voltage to the first injection valve electrode and applying a positive voltage to the second injection valve electrode, and the exhaust valve is opened by applying a positive voltage to the first exhaust valve electrode of the exhaust valve electrode pair and applying a negative or zero voltage to the second exhaust valve electrode, and the exhaust valve is closed by applying a negative or zero voltage to the first exhaust valve electrode and applying a positive voltage to the second injection valve electrode.

[Item 13]

The electrowetting device according to Item 1, in which the injection valve includes an injection valve electrode for applying a voltage to the first valve body, the injection valve electrode being wholly or partially located in an inner region inside the sealing region at the electrode substrate.

[Item 14]

The electrowetting device according to Item 13, further including an exhaust valve for taking out air in the gap, the exhaust valve being located in the sealing region, and including a second valve body formed of an electric field responsive gel, in which the exhaust valve includes an exhaust valve electrode for applying a voltage to the second valve body, the exhaust valve electrode being wholly or partially located in the inner region.

[Item 15]

The electrowetting device according to any one of Items 1 to 14, in which the counter substrate further includes a plurality of second drive electrodes formed on the second substrate and a second water-repellent insulating layer formed on the second drive electrodes.

[Item 16]

The electrowetting device according to any one of Items 1 to 15, in which the plurality of first drive electrodes are passive matrix electrodes arranged in rows and columns.

An exemplary embodiment of the present disclosure provides an electrowetting device that can improve quality and performance without requiring a step of opening a hole in a substrate.

DETAILED DESCRIPTION OF THE INVENTION

Figure 1:
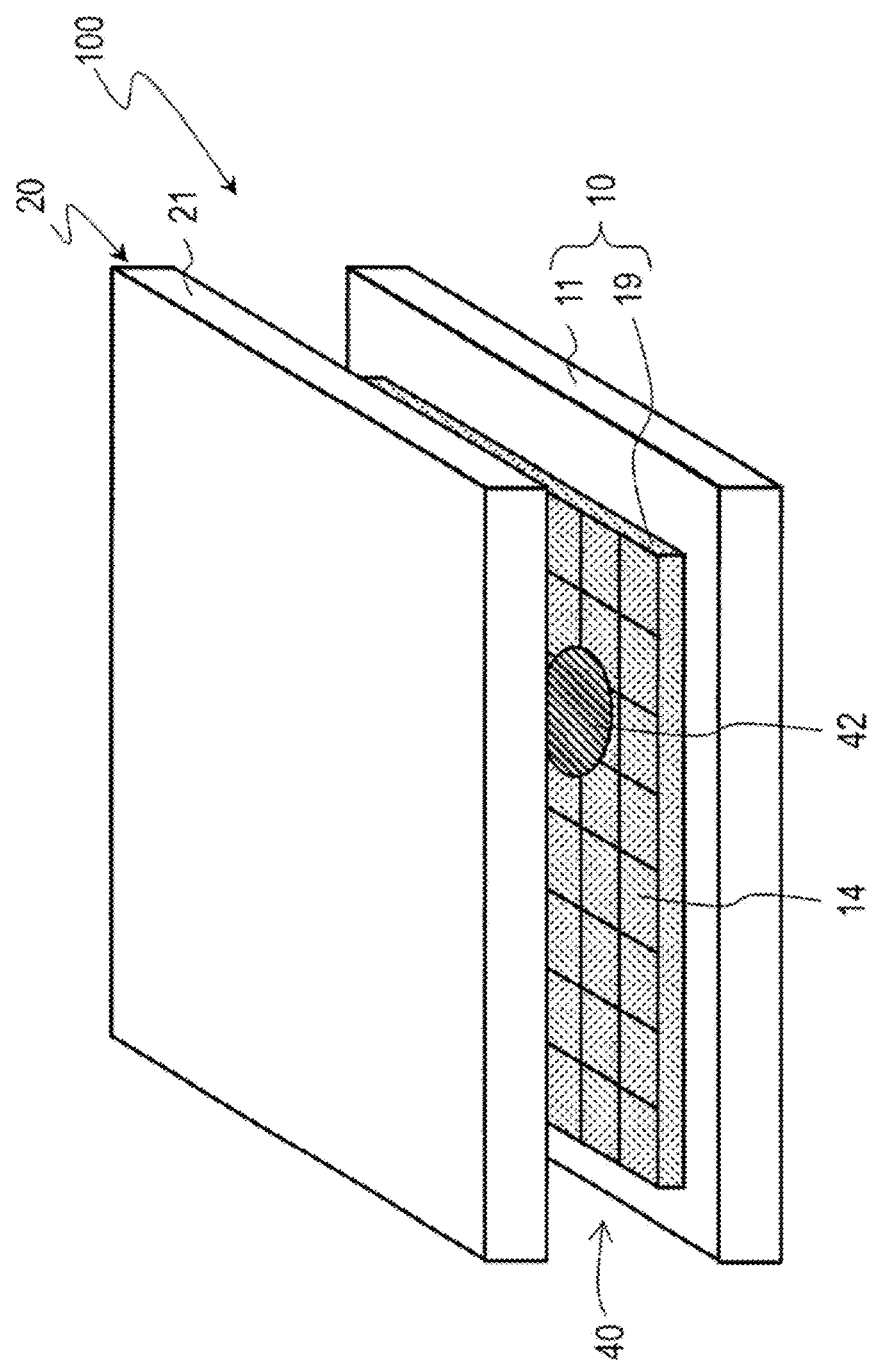
FIG. 1 is a perspective view schematically illustrating a schematic overall configuration of an EWOD 100.

An electrowetting device of the present disclosure, in a non-limiting exemplary embodiment, includes an electrode substrate including a first substrate, a plurality of first drive electrodes formed on the first substrate, and a water-repellent insulating layer formed on the plurality of first drive electrodes, a counter substrate including a second substrate, and disposed so as to face the electrode substrate with a predetermined gap therebetween, a sealing portion provided in a sealing region at the electrode substrate, and bonding the electrode substrate and the counter substrate, and an injection valve for injecting a droplet into the gap, the injection valve being located in the sealing region and including a first valve body formed of an electric field responsive gel. The electrowetting device may optionally further include an exhaust valve for taking out air in the gap, the exhaust valve being located in the sealing region, and including a second valve body formed of the electric field responsive gel. For example, the first substrate and the second substrate are glass substrates. The electric field responsive gel is a material having a property of causing creep deformation when a voltage is applied, and a typical example thereof is a polyvinyl chloride (PVC) gel.

The electrowetting device is, for example, a passive matrix type electrowetting device. In the present specification, a passive matrix type electrowetting device is taken as an example, but the electrowetting device according to the embodiments of the present invention is not limited to the illustrated one, and may be an active matrix type electrowetting device. In the following description, "EWOD" refers to a passive matrix type electrowetting device.

The electrode substrate is a passive matrix (PM) substrate having drive electrodes arranged in rows and columns.

However, the electrode substrate may be an active matrix substrate having a plurality of thin film transistors (TFT). Further, in the present specification, the terms "sealing material" and "sealing portion" formed of the sealing material may be used interchangeably. In the description of the structure of the device, a "sealing portion" is mainly used, and in the description of the method of manufacturing the device, a "sealing material" is mainly used.

Hereinafter, embodiments of the present invention will be described with reference to the accompanying drawings. Note that, an unnecessarily detailed description may be omitted. For example, detailed descriptions of well-known matters and duplicate descriptions of substantially the same configuration may be omitted. This is to prevent the following description from being unnecessarily redundant and to facilitate understanding by those skilled in the art. The inventors provide the accompanying drawings and the description below for those skilled in the art to fully understand the present disclosure. These are not intended to limit the subject matter of the scope of patent claims. In the following description, the same or similar components are denoted by the same reference numerals.

Embodiment 1

[1. Structure of EWOD 100]

An EWOD 100 according to the present embodiment will be described with reference to FIGS. 1 to 4B.

Figure 2:
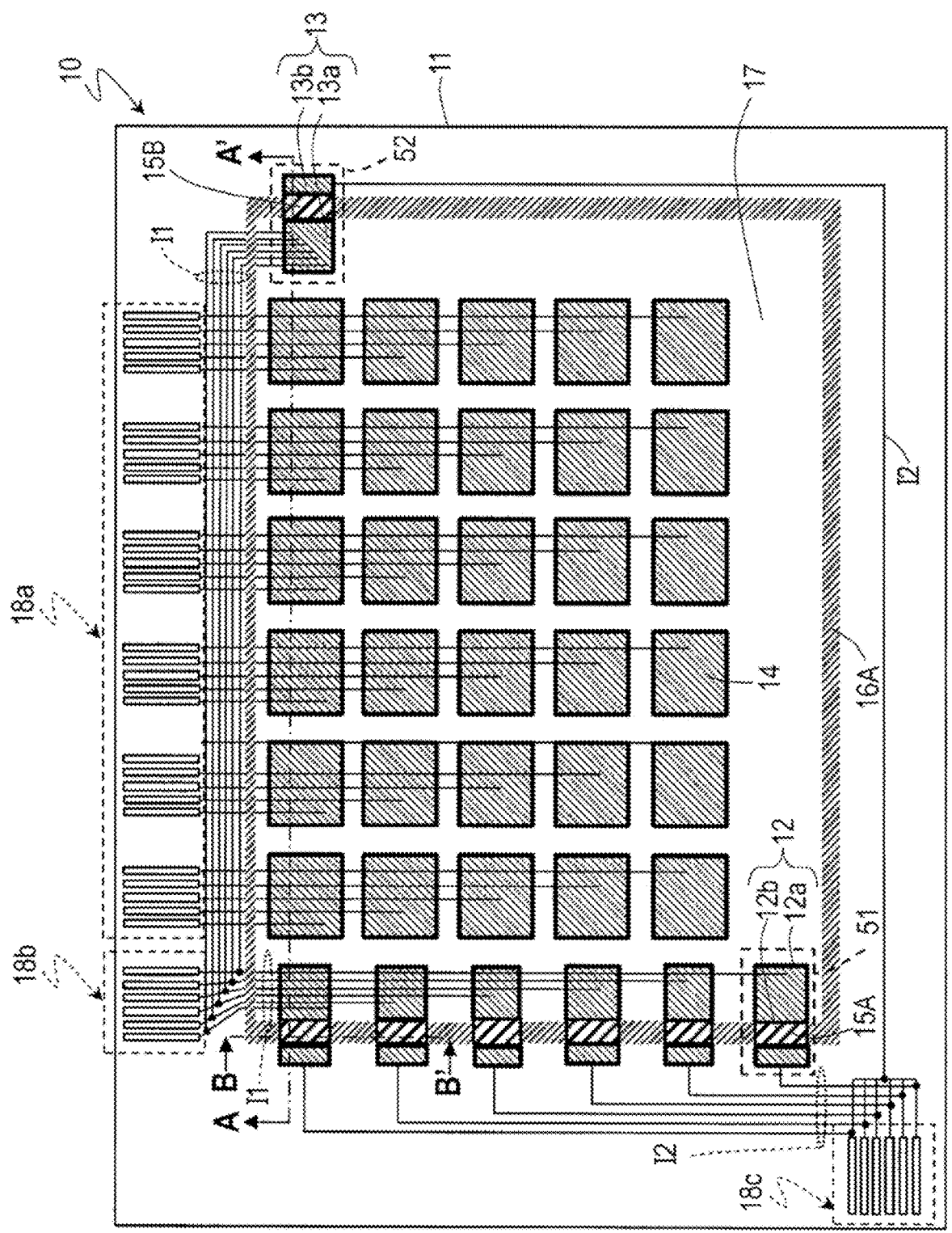
FIG. 2 is a plan view schematically illustrating a layout example of electrodes on an electrode substrate 10 when viewed from a direction normal to a substrate.
Figure 3A:
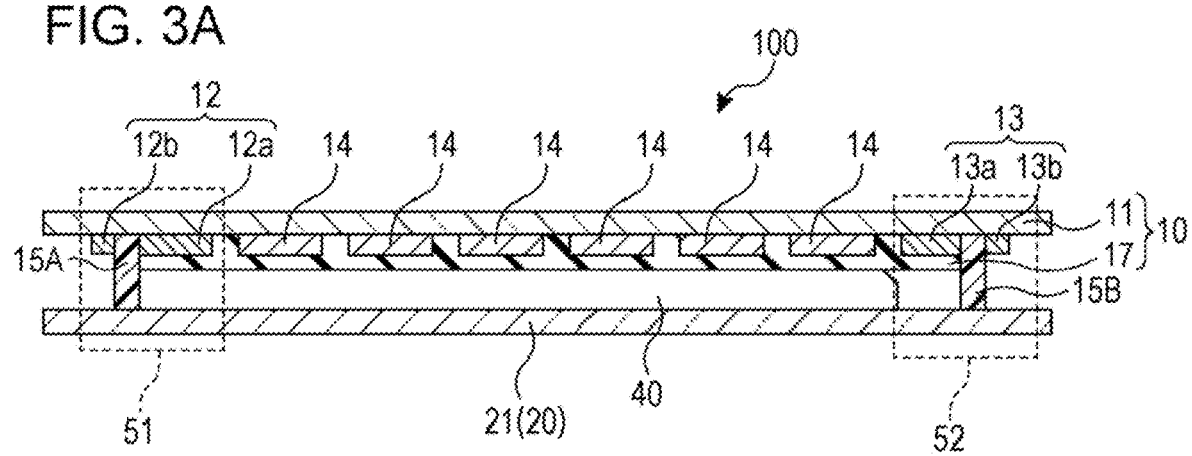
FIG. 3A is a cross-sectional view schematically illustrating a cross-sectional structure A-A' of the EWOD 100 when cut along the line AA' illustrated in FIG. 2.
Figure 3B:
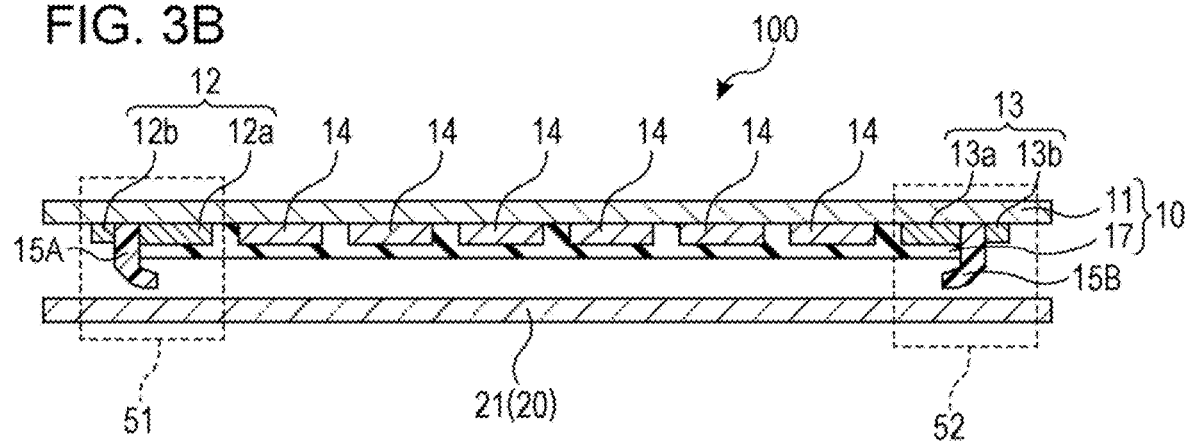
FIG. 3B is a cross-sectional view schematically illustrating a cross-sectional structure A-A' of the EWOD 100 when cut along the line AA' illustrated in FIG. 2.
Figure 4A:
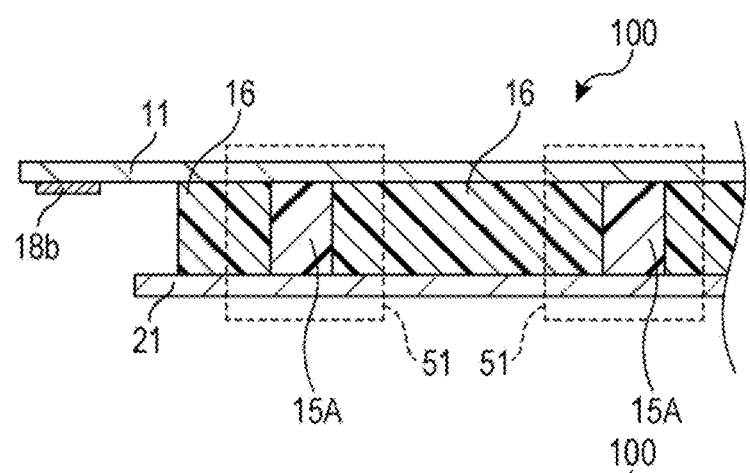
FIG. 4A is a cross-sectional view schematically illustrating a cross-sectional structure B-B' of the EWOD 100 when cut along the line BB' illustrated in FIG. 2.
Figure 4B:
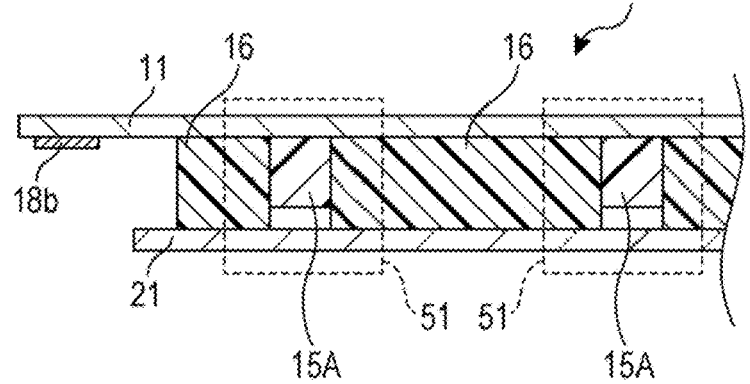
FIG. 4B is a cross-sectional view schematically illustrating a cross-sectional structure B-B' of the EWOD 100 when cut along the line BB' illustrated in FIG. 2.

FIG. 1 is a perspective view schematically illustrating a schematic overall configuration of the EWOD 100. In order not to complicate the drawing, an injection valve, an exhaust valve and a terminal electrode group are not illustrated. FIG. 2 is a plan view schematically illustrating a layout example of electrodes on an electrode substrate 10 when viewed from a direction normal to a substrate. FIGS. 3A and 3B are cross-sectional views schematically illustrating a cross-sectional structure A-A' of the EWOD 100 when cut along the line AA' illustrated in FIG. 2. FIGS. 4A and 4B are cross-sectional views schematically illustrating a cross-sectional structure B-B' of the EWOD 100 when cut along the line BB' illustrated in FIG. 2. FIGS. 3A and 4A illustrate a state in which the valve body is closed, and FIGS. 3B and 4B illustrate a state in which the valve body is opened.

The EWOD 100 includes the electrode substrate 10 and a counter substrate 20. The counter substrate 20 is disposed so as to face the electrode substrate 10 with a predetermined gap 40 therebetween.

The electrode substrate 10 has a substrate 11, an injection valve 51, an exhaust valve 52, a plurality of drive electrodes 14, a water-repellent insulating layer 17, and terminal electrode groups 18a, 18b, and 18c. The substrate 11 is, for example, a glass substrate.

The plurality of drive electrodes 14 are provided on the substrate 11 (that is, supported by the substrate 11). The plurality of drive electrodes 14 is an electrode group and are arranged in a matrix in rows and columns, and form a drive electrode (PM electrode) region 19. A voltage can be supplied to each of the plurality of drive electrodes 14 independently. Hereinafter, each of the plurality of drive electrodes 14 is referred to as a "unit electrode". The unit electrode 14 is formed of, for example, ITO.

A sealing region 16A for applying a sealing material used for bonding both substrates is present so as to surround the group of unit electrodes 14. The substantially rectangular sealing region 16A has sides extending in the row direction and the column direction, respectively. A region inside the sealing region 16A at the electrode substrate 10 is called an "inner region", and a region outside the sealing region 16A is called an "outer region". The group of unit electrodes 14 is located in the inner region.

The sealing portion 16 is provided in a region other than the region where the valve body (first valve body) 15A of the injection valve 51 and the valve body (second valve body) 15B of the exhaust valve 52 are disposed in the sealing region 16A. The sealing portion 16 is a member that bonds the electrode substrate 10 and the counter substrate 20 together.

At least one injection valve 51 for injecting a droplet 42 into the gap 40 is disposed along the side of the sealing region 16A extending in the column direction. Each injection valve 51 is located in the sealing region 16A. The sealing portion 16 (or sealing material) is present between valve bodies 15A of the two adjacent injection valves 51. FIG. 2 illustrates an example in which six injection valves 51 are disposed on the electrode substrate 10, but a single or two or more injection valves 51 may be disposed on the electrode substrate 10. Further, the exhaust valve 52 is disposed on the side opposite to the side of the sealing region 16A where the injection valve 51 is located, with the inner region therebetween. However, the exhaust valve 52 is not an essential component of the EWOD 100. By disposing the exhaust valve 52, it is possible to inject a liquid and a droplet from the injection valve while taking out the air in the gap 40 outside, and an advantage is obtained in that a liquid or a droplet is easily guided into the gap 40.

The injection valve 51 has a valve body 15A and an injection valve electrode pair 12 for partially sandwiching the valve body 15A and applying a voltage to the valve body 15A. The valve body 15A is formed of an electric field responsive gel. The injection valve electrode pair 12 is provided on the substrate 11 similarly to the unit electrode 14. The injection valve electrode pair 12 has an injection valve electrode 12a and an injection valve electrode 12b.

The plurality of valve bodies 15A of the plurality of injection valves 51 are disposed along the side of the sealing region 16A extending in the column direction. The injection valve electrode 12a is disposed in the inner region at the electrode substrate 10, and the injection valve electrode 12b is disposed in the outer region at the electrode substrate 10. The injection valve electrode 12a and the injection valve electrode 12b sandwich a part of the valve body 15A.

The exhaust valve 52 has a valve body 15B and an exhaust valve electrode pair 13 that partially sandwiches the valve body 15B and applies a voltage to the valve body 15B. The valve body 15B is formed of an electric field responsive gel, similar to the valve body 15A. The exhaust valve electrode pair 13 is provided on the substrate 11, similarly to the injection valve electrode pair 12 and the unit electrode 14. The exhaust valve electrode pair 13 has an exhaust valve electrode 13a and an exhaust valve electrode 13b. The exhaust valve electrode 13a is disposed in the inner region at the electrode substrate 10, and the exhaust valve electrode 13b is disposed in the outer region at the electrode substrate 10. The exhaust valve electrode 13a and the exhaust valve electrode 13b sandwich a part of the valve body 15B.

However, the injection valve electrode 12b and the exhaust valve electrode 13b are not essential. The injection valve of the EWOD according to the present disclosure may have only the injection valve electrode 12a of the injection valve electrode 12a and the injection valve electrode 12b, and the exhaust valve may have only the exhaust valve electrode 13a of the exhaust valve electrode 13a and the exhaust valve electrode 13b. By providing the injection valve electrode 12b and the exhaust valve electrode 13b in the injection valve 51 and the exhaust valve 52, respectively, the closing operation of the valve body can be accelerated.

The electrode substrate 10 further has a plurality of terminal electrode groups 18a, 18b, and 18c. The plurality of terminal electrode groups 18a, 18b, and 18c are disposed in the outer region at the substrate 11. The terminal electrode group 18a is an electrode for supplying a desired control signal required for driving a droplet from an external drive circuit (not illustrated) to the unit electrode 14. Each terminal electrode included in the terminal electrode group 18a is connected to the corresponding unit electrode 14 on a one-to-one basis.

The terminal electrode groups 18b and 18c are electrodes for supplying a desired control signal required for opening/closing the injection valve 51 and the exhaust valve 52 from an external drive circuit.

The injection valve electrode 12a of the injection valve 51 and the exhaust valve electrode 13a of the exhaust valve 52 are electrically connected in common to one corresponding terminal electrode of the terminal electrode group 18b via a wiring line I1. Therefore, all the terminal electrodes included in the terminal electrode group 18b are commonly connected to the exhaust valve electrode 13a via a bundle of the wiring lines I1. Further, the injection valve electrode 12b of the injection valve 51 and the exhaust valve electrode 13b of the exhaust valve 52 are electrically connected in common to one corresponding terminal electrode of the terminal electrode group 18c via a wiring line I2. Therefore, all the terminal electrodes included in the terminal electrode group 18c are commonly connected to the exhaust valve electrode 13b via the wiring line I2.

In the injection valve 51, the area of the injection valve electrode 12a is larger than the area of the injection valve electrode 12b, and in the exhaust valve 52, the area of the exhaust valve electrode 13a is larger than the electrode of the exhaust valve electrode 13b. Further, the area of the unit electrode 14 is larger than any of the injection valve electrode 12a, the injection valve electrode 12b, the exhaust valve electrode 13a, and the exhaust valve electrode 13b.

According to the above connection relationship between the terminal and the electrode, a common control signal can be provided from one corresponding terminal electrode of the terminal electrode group 18b to the injection valve electrode 12a and the exhaust valve electrode 13a via the wiring line I1. Further, another common control signal can be provided from one corresponding terminal electrode of the terminal electrode group 18c to the injection valve electrode 12b and the exhaust valve electrode 13b via the wiring line I2. As a result, opening/closing of one injection valve 51 selected from a plurality of injection valves and exhaust valve 52 can be simultaneously controlled.

The electric field responsive gel forming the valve bodies 15A and 15B is a plate-like gel and can be driven in the atmosphere. A typical example of the electric field responsive gel is a PVC gel. Since an inexpensive PVC gel can be used, product cost can be reduced. As a gel material other than PVC, polymethyl methacrylate, polyurethane, polystyrene, polyvinyl acetate, nylon 6, polyvinyl alcohol, polycarbonate, polyethylene terephthalate, polyacrylonitrile, silicone rubber, and the like can be widely used.

A water-repellent (or hydrophobic) insulating layer (dielectric layer) is formed so as to cover the group of unit electrodes 14, the injection valve electrode 12a of the injection valve electrode pair 12, and the exhaust valve electrode 13a of the exhaust valve electrode pair 13. In other words, the water-repellent insulating layer is provided on these electrodes. For example, the water-repellent insulating layer may be a single-layer film formed of a water-repellent high dielectric constant material, or a laminate having a dielectric layer and a water-repellent layer.

When the water-repellent insulating layer is a laminate, the dielectric layer is provided on an electrode group including the unit electrode 14, the injection valve electrode 12a, and the exhaust valve electrode 13a. The water-repellent layer is provided on the electrode group with the dielectric layer therebetween. In other words, the dielectric layer is provided between the electrode group and the water-repellent layer. The dielectric layer is, for example, a SiN layer or $SiO_2$ layer of 100 nm or more and 500 nm or less. The water-repellent layer is, for example, a fluorine-based resin layer having a thickness of 30 nm or more and 100 nm or less.

The counter substrate 20 has a substrate 21 and is disposed so as to oppose the electrode substrate 10 with the predetermined gap 40 therebetween. The substrate 21 is, for example, a glass substrate. The counter substrate 20 of the EWOD according to the present embodiment is a glass substrate.

The counter substrate 20 may further include a counter electrode (not illustrated) formed on the substrate 21 and a water-repellent insulating layer (not illustrated) formed on the counter electrode. The counter electrode is formed of, for example, ITO. In that case, the counter electrode is disposed on the glass so as to face the group of the unit electrodes 14. The thickness of the counter electrode is, for example, 50 nm or more and 150 nm or less. The water-repellent insulating layer is provided on the counter electrode. The water-repellent insulating layer is, for example, a fluorine-based resin layer having a thickness of 30 nm or more and 100 nm or less. By disposing the ITO electrode on the counter substrate 20, it is possible to set a high drive voltage.

The droplet 42 is disposed in the gap (flow path) 40 formed between the electrode substrate 10 and the counter substrate 20. The droplet 42 may be a single droplet or a plurality of droplets, and is injected from an injection valve 51 located in the sealing region 16A at the electrode substrate 10. For the droplet 42, a conductive liquid such as an ionic liquid or a polar liquid is used. As the droplet 42, for example, water, an electrolytic solution (aqueous solution of an electrolyte), alcohols, and various ionic liquids can be used. Examples of such liquids include whole blood samples, bacterial cell suspensions, protein, or antibody solutions, and various buffer solutions.

A non-conductive liquid that is immiscible with the droplet 42 may be injected into the gap 40. For example, a space other than the droplet 42 in the gap 40 may be filled with a non-conductive liquid. The non-conductive liquid is injected from the injection valve 51 before injecting the droplet 42. As the non-conductive liquid, a non-polar liquid (non-ionic liquid) having a surface tension smaller than the droplet 42 can be used. Examples of the non-conductive liquid include hydrocarbon-based solvents (low molecular hydrocarbon-based solvents) such as decane, dodecane, hexadecane, and undecane, oils such as silicone oil, and fluorocarbon solvents. Examples of the silicone oil include dimethylpolysiloxane and the like. As the non-conductive liquid, only one type may be used, or a plurality of types may be appropriately mixed and used.

As the non-conductive liquid, a liquid having a specific gravity smaller than the specific gravity of the droplet 42 is selected. The specific gravity of the droplet 42 and the specific gravity of the non-conductive liquid are not particularly limited as long as the relationship of the specific gravity of the non-conductive liquid<the specific gravity of the droplet 42 is satisfied. For example, when the droplet 42 is an electrolyte aqueous solution, the specific gravity of the droplet 42 is substantially the same as the specific gravity of water (=1.0). As the non-conductive liquid, for example, a liquid having a specific gravity of less than 1.0, such as silicone oil, can be used.

Figure 5A:
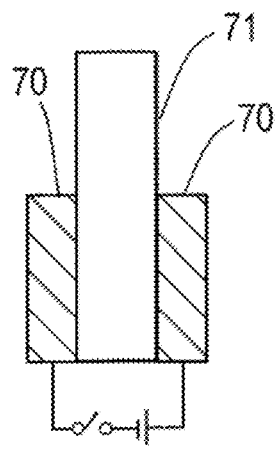
FIG. 5A is a diagram for explaining the driving principle of an electric field responsive gel.
Figure 5B:
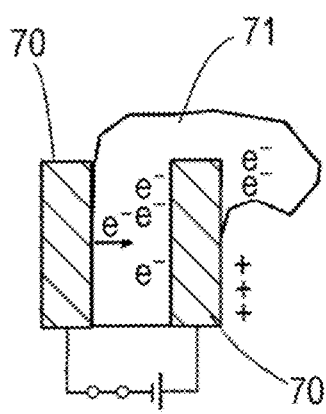
FIG. 5B is a diagram for explaining the driving principle of the electric field responsive gel.

FIGS. 5A and 5B are diagrams for explaining the driving principle (or the bending deformation mechanism) of the electric field responsive gel. FIG. 5A illustrates a state of a plate-like electric field responsive gel 71 sandwiched between an electrode pair 70 in a state in which no voltage is applied, and FIG. 5B illustrates a state of the plate-shaped electric field responsive gel 71 sandwiched between the electrode pair 70 in a state in which a voltage is applied.

The contracting action of the electric field responsive gel 71 results from creep deformation of the gel. It is considered that this creep deformation occurs due to the interaction force acting in the depth direction at a depth of several tens of μm from the contact surface where the gel comes into contact with the surface of the anode of the electrode pair 70. When a voltage is applied to the electric field responsive gel 71, for example, a PVC gel, a charge moves from the cathode of the electrode pair 70 to the anode through the electric field responsive gel 71. The charge moved to the anode side is accumulated near the anode before being discharged at the anode and disappearing. As a result, the charge density locally increases near the surface of the electric field responsive gel 71, and an electrostatic attraction acts between the charge and the anode. The electrostatic attraction draws the electric field responsive gel 71 toward the anode side. The electric field responsive gel 71 crawls on the surface of the anode, and creep deformation occurs.

When the applied voltage is removed from the electric field responsive gel 71, this time, the electrostatic attraction disappears due to the discharge. As a result, due to the inherent elasticity of the gel, the electric field responsive gel 71 returns to the original state where the voltage is to be applied. The applied voltage depends on, for example, the composition ratio of PVC, the distance between the electrode substrate and the counter substrate, and the like.

In the present embodiment, each of the injection valve 51 and the exhaust valve 52 has a structure in which the electrode pair sandwiches a part of the plate-like PVC gel from both ends. As illustrated in FIG. 5B, when a positive voltage is applied to one of the electrode pair, creep deformation induces bending deformation, and the electric field responsive gel 71 concentrates on the tip of the anode. On the other hand, as illustrated in FIG. 5A, when the applied voltage is removed from the electric field responsive gel 71, the charge disappears due to the discharge, and the electric field responsive gel 71 returns to its original state by elasticity.

Refer to FIGS. 3A to 4B again.

For example, when a positive voltage is applied to the injection valve electrode 12a of the injection valve electrode pair 12 and a negative voltage is applied to the injection valve electrode 12b, bending deformation is induced by creep deformation, and the valve body 15A is bent toward the inside of the gap 40. As a result, the injection valve 51 opens. Similarly to the injection valve 51, for example, when a positive voltage is applied to the exhaust valve electrode 13a of the exhaust valve electrode pair 13 and a negative voltage is applied to the exhaust valve electrode 13b, bending deformation is induced by the creep deformation, and the valve body 15B is bent into the gap 40. As a result, the exhaust valve 52 opens.

As described above, when a positive voltage is applied to one of the electrode pair, the valve body formed of electric field responsive gel is drawn to the electrode side, and the injection valve 51 and the exhaust valve 52 are opened as illustrated in FIGS. 3B and 4B. Unless a voltage is applied to any of the electrodes of the electrode pair, the injection valve 51 and the exhaust valve 52 remain closed as illustrated in FIGS. 3A and 4A.

The operation for injecting the non-conductive liquid into the gap 40 by controlling the opening/closing of the injection valve 51 and the exhaust valve 52 will be described in detail with reference to FIGS. 6 to 8C. Hereinafter, the non-conductive liquid 41 is referred to as "oil 41".

Figure 6:
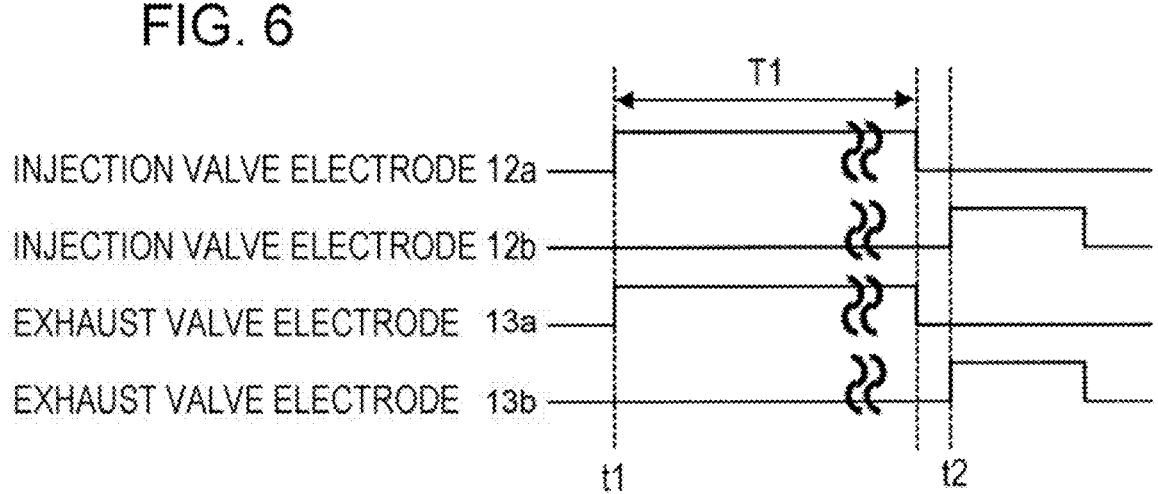
FIG. 6 is a diagram illustrating an example of timing for applying a desired control signal to an injection valve electrode pair 12 and an exhaust valve electrode pair 13 for controlling the opening/closing of the injection valve 51 and the exhaust valve 52.
Figure 7:
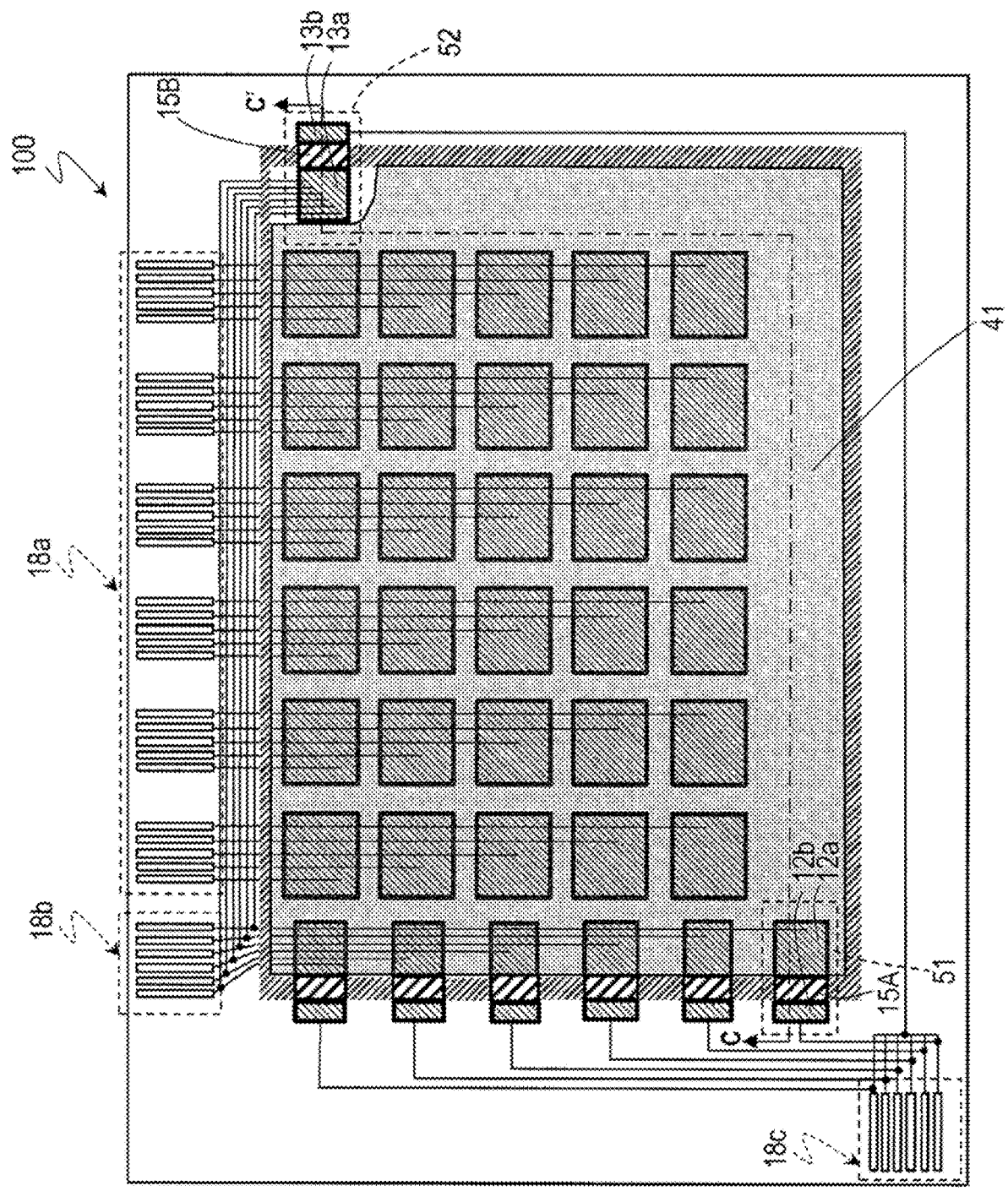
FIG. 7 is a diagram illustrating a state of the EWOD 100 in a state in which oil 41 fills a gap 40.
Figure 8A:
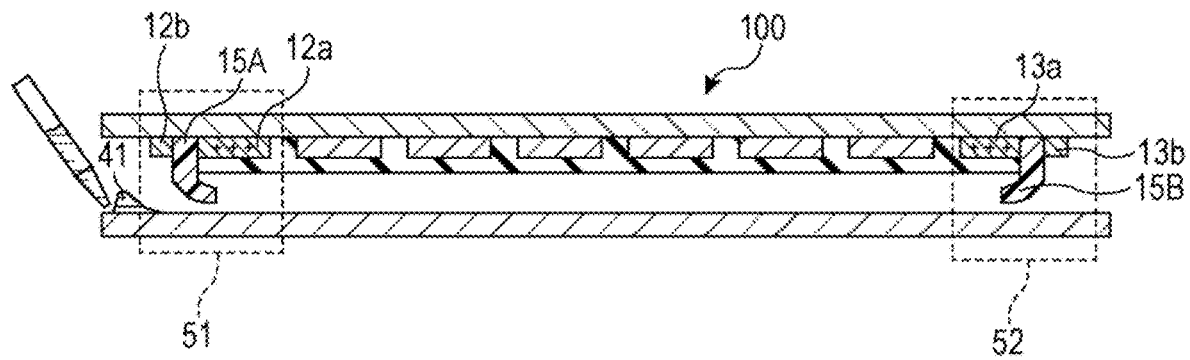
FIG. 8A is a cross-sectional view schematically illustrating a cross-sectional structure C-C' of the EWOD 100 when cut along the line CC' illustrated in FIG. 7.
Figure 8B:
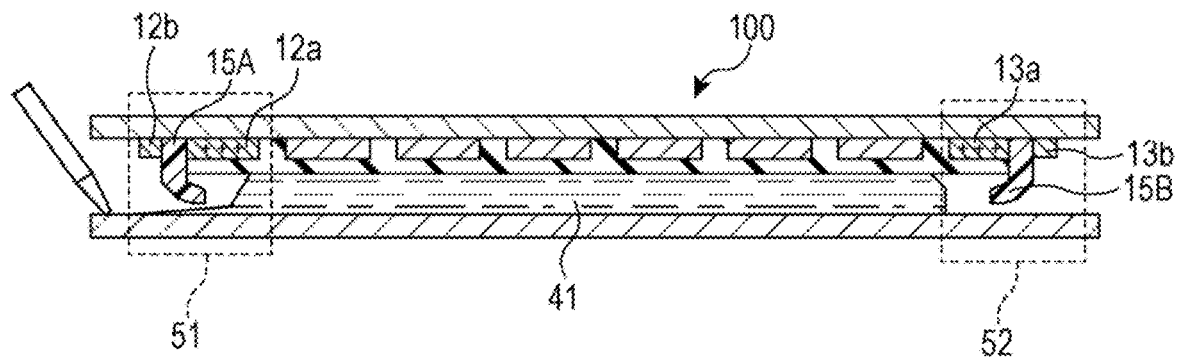
FIG. 8B is a cross-sectional view schematically illustrating a cross-sectional structure C-C' of the EWOD 100 when cut along the line CC' illustrated in FIG. 7.
Figure 8C:
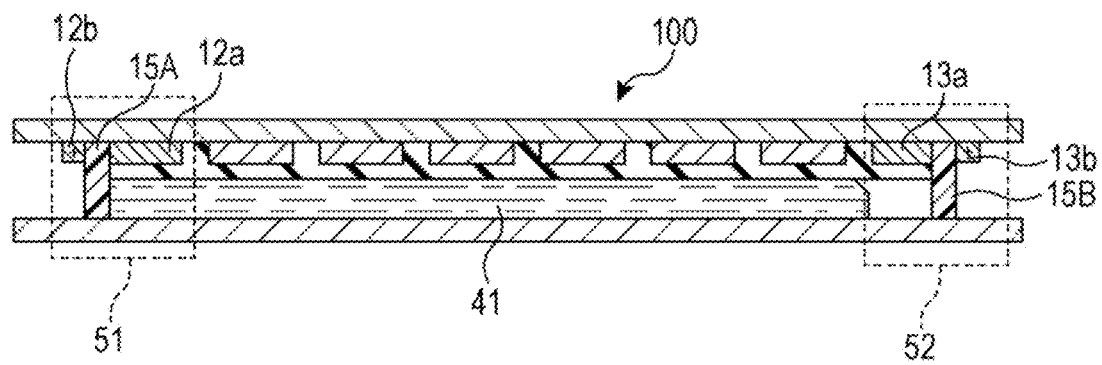
FIG. 8C is a cross-sectional view schematically illustrating a cross-sectional structure C-C' of the EWOD 100 when cut along the line CC' illustrated in FIG. 7.

FIG. 6 is a diagram illustrating an example of timing for applying a desired control signal to the injection valve electrode pair 12 and the exhaust valve electrode pair 13 for controlling the opening/closing of the injection valve 51 and the exhaust valve 52. FIG. 7 is a diagram illustrating a state of the EWOD 100 in a state in which the oil 41 fills the gap 40. FIGS. 8A to 8C are cross-sectional views schematically illustrating a cross-sectional structure C-C' of the EWOD 100 when cut along the line CC' illustrated in FIG. 7.

Regarding the opening/closing of the injection valve 51, the injection valve 51 is opened by applying a positive voltage to the injection valve electrode 12a of the injection valve electrode pair 12 and applying a negative or zero voltage to the injection valve electrode 12b. On the other hand, the injection valve is closed by applying a negative or zero voltage to the injection valve electrode 12a and applying a positive voltage to the injection valve electrode 12b.

Regarding the opening/closing of the exhaust valve 52, the exhaust valve 52 is opened by applying a positive voltage to the exhaust valve electrode 13a of the exhaust valve electrode pair 13 and applying a negative or zero voltage to the exhaust valve electrode 13b. On the other hand, the exhaust valve 52 is closed by applying a negative or zero voltage to the exhaust valve electrode 13a and applying a positive voltage to the exhaust valve electrode 13b. The opening/closing of the injection valve 51 and the exhaust valve 52 are performed at the same timing.

In the present embodiment, as illustrated in FIG. 2, since the injection valve electrode 12a and the exhaust valve electrode 13a are connected in parallel by the same wiring line I1, and the injection valve electrode 12b and the exhaust valve electrode 13b are connected in parallel by the same wiring line I2, the opening/closing of the injection valve 51 and the exhaust valve 52 are performed at the same timing. However, this opening/closing timing is an example, and the opening/closing of the injection valve 51 and the exhaust valve 52 may be performed independently. In this case, for example, it is possible to apply different voltages at different timings, so that the degree of freedom in controlling the valve body is increased.

First, at time t1, a positive voltage is applied to the injection valve electrode 12a and the exhaust valve electrode 13a via a terminal electrode group 18b, and a negative or zero (GND) voltage is applied to the injection valve electrode 12b and the exhaust valve electrode 13b via a terminal electrode group 18c. As a result, the valve body 15A of the injection valve 51 is drawn toward the injection valve electrode 12a, and the valve body 15B of the exhaust valve 52 is drawn toward the exhaust valve electrode 13a, so that each valve body is bent inside the gap 40. As a result, a crack is generated between the counter substrate 20 and the valve body 15A and between the counter substrate 20 and the valve body 15B. This state is the open state of the valve. As illustrated in FIG. 8A, the oil 41 is injected into the gap 40 through the crack.

A positive voltage is applied to the injection valve electrode 12a and the exhaust valve electrode 13a during a period T1, and the injection valve 51 and the exhaust valve 52 are kept open. As illustrated in FIG. 8B, the inside of the gap 40 is filled with the oil 41 until, for example, 85% to 90% of the internal volume is satisfied.

After the period T1 has elapsed from the time t1, a negative or zero voltage is applied to the injection valve electrode 12a and the exhaust valve electrode 13a via the terminal electrode group 18b. Thereafter, at time t2, the application of a positive voltage to the injection valve electrode 12b and the exhaust valve electrode 13b via the terminal electrode group 18c is started. By continuing to apply a positive voltage for a certain period, the valve bodies 15A and 15B and the gap 40 return to the original state (or shape). As illustrated in FIG. 8C, the injection valve 51 and the exhaust valve 52 are closed at the same time, and the injection of the oil 41 is completed. After the completion, the supply of voltage to the injection valve electrode 12b and the exhaust valve electrode 13b is stopped.

By stopping the voltage supply to the injection valve electrode 12a and the exhaust valve electrode 13a, the valve bodies 15A and 15B try to return to the original state by the elasticity of the gel. Therefore, it is not always necessary to apply a positive voltage to the injection valve electrode 12b and the exhaust valve electrode 13b, and it is not necessary to provide the electrodes of the injection valve electrode 12b and the exhaust valve electrode 13b. However, as described above, the time required to close the injection valve 51 and the exhaust valve 52 can be reduced by applying a positive voltage to the injection valve electrode 12b and the exhaust valve electrode 13b.

By filling the gap 40 with a non-conductive liquid such as silicone oil, evaporation of the microfluid, that is, the droplet 42 can be suppressed, and the driving performance of the device can be improved. However, when the injection hole is provided in the upper substrate according to the related art, the liquid filling inside the EWOD is always exposed to the atmosphere through the injection hole. Therefore, the amount of liquid filling may decrease due to the natural volatilization of the liquid. As described above, there is a problem not only in terms of quality but also in terms of performance that the drivability of the device may be reduced.

Further, when an instrument such as a dropper used for injecting a liquid or a droplet is inserted into the gap through the hole in the upper substrate, the lower substrate may be damaged. In order to avoid that, it has been proposed to provide a dedicated mechanism for injection, such as a Praphat or a fitting mechanism, in the device. However, the device structure becomes more complicated, and as a result, problems such as increased cost and reduced portability may newly occur.

A valve for adjusting a flow rate of a liquid used in a fluid device has been proposed. For example, International Publication No. 2016/136551 discloses a fluid device including a substance having shape memory and a heat converter. The substance is used as a valve for flow control and is deformed by heating. The valve is deformed by applying the thermal energy converted by the heat converter to the substance, and the valve is opened/closed. During heating, the valve is closed, and when not heating, the valve is opened. Such a fluid device can be manufactured simply and at low cost. However, a mechanism for providing thermal energy to the valve is essential. Since opening/closing of the valve requires heating, it is not advisable to adopt a mechanism that requires heating for opening/closing to a valve in an EWOD filled with a filling liquid such as silicone oil. This is because the heating further promotes the volatilization of the filling liquid.

According to the configuration of the injection valve 51 and the exhaust valve 52 according to the present embodiment, since the valve body formed of the electric field responsive gel that can be controlled by voltage is used for the injection valve 51 and the exhaust valve 52, loss of the oil (liquid) 41 due to volatilization can be appropriately prevented. Further, oil leakage that can occur from the side of the device can be appropriately prevented. Further, in order to inject the oil 41 and the droplet 42 from a crack generated between the counter substrate 20 and the valve body 15A and between the counter substrate 20 and the valve body 15B, a control signal (that is, drive voltage) for controlling the driving of the droplet can be commonly used as a drive voltage for controlling the opening/closing of the valve. In other words, it becomes possible to supply a control signal to the injection valve electrode pair 12, the exhaust valve electrode pair 13, and the unit electrode 14 from a common drive circuit. The injection valve 51 and the exhaust valve 52 do not particularly require a dedicated drive circuit.

In the EWOD, a droplet is driven by applying a voltage to the droplet and changing the affinity of the droplet for the electrode. By turning the drive voltage on/off, the condensation and expansion of the electric field responsive gel are electrically controlled, and an injection valve and an exhaust valve are realized. The injection valve electrode 12a of the injection valve 51 functions as an electrode for controlling opening/closing of the valve when injecting a droplet, and also functions as a unit electrode when moving the droplet.

Here, the principle of how the droplet 42 can be moved by electrowetting will be briefly described with reference to FIGS. 9A to 9C.

Figure 9A:
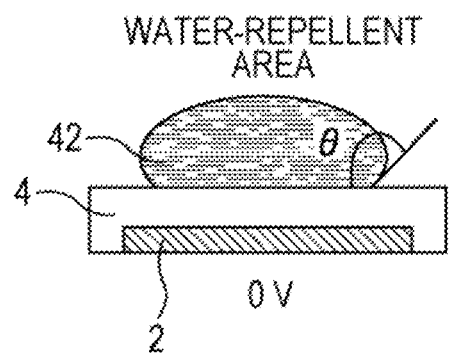
FIG. 9A is a schematic diagram for explaining the principle of how a droplet 42 can be moved by electrowetting.
Figure 9B:
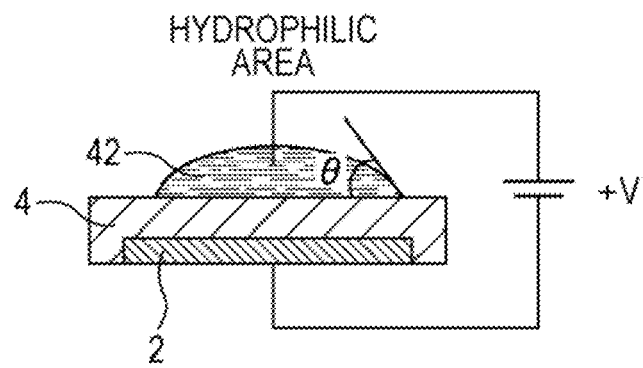
FIG. 9B is a schematic diagram for explaining the principle of how the droplet 42 can be moved by electrowetting.
Figure 9C:
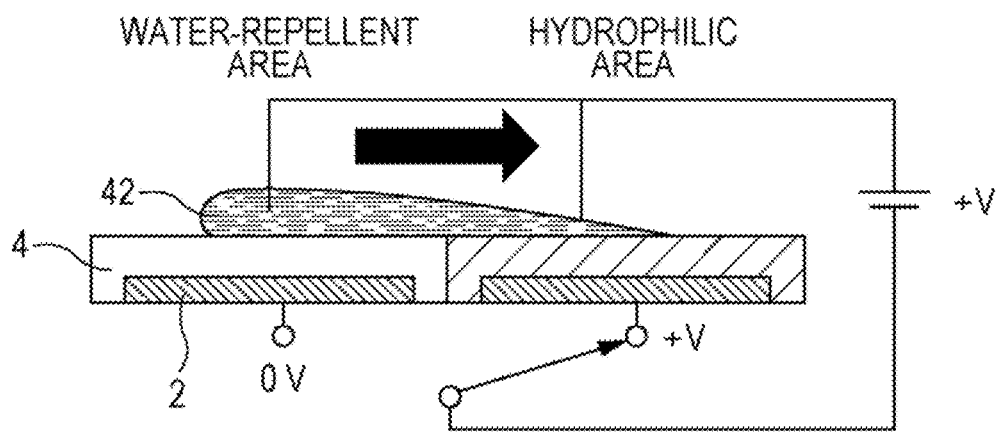
FIG. 9C is a schematic diagram for explaining the principle of how the droplet 42 can be moved by electrowetting.

FIGS. 9A to 9C are schematic diagrams for explaining the principle of how the droplet 42 can be moved by electrowetting.

As already described, electrowetting is a phenomenon in which, when an electric field is applied to the droplet 42 disposed on a water-repellent dielectric layer (water-repellent layer) 4 provided on an electrode 2, the contact angle $\theta$ of the droplet 42 with respect to the dielectric layer 4 changes. Therefore, as illustrated in FIG. 9A, in the state where no voltage is applied, the region on the electrode 2 is a water-repellent ($\theta>90°$) region (hereinafter referred to as a "water-repellent area"), and as illustrated in FIG. 9B, when a predetermined voltage (+V) is applied, the region on the electrode 2 can be made hydrophilic ($\theta<90°$) region (hereinafter, referred to as "hydrophilic area"). Therefore, as illustrated in FIG. 9C, when the water-repellent area is adjacent to the hydrophilic area, the droplet 42 in the water-repellent area moves to the hydrophilic area. By continuing this operation, the droplet 42 can be freely moved on a drive electrode region 19.

An example of a method of controlling an electrode for injecting and driving the droplet 42 into the gap 40 filled with the oil 41 will be described with reference to FIGS. 10 to 11F.

Figure 10:
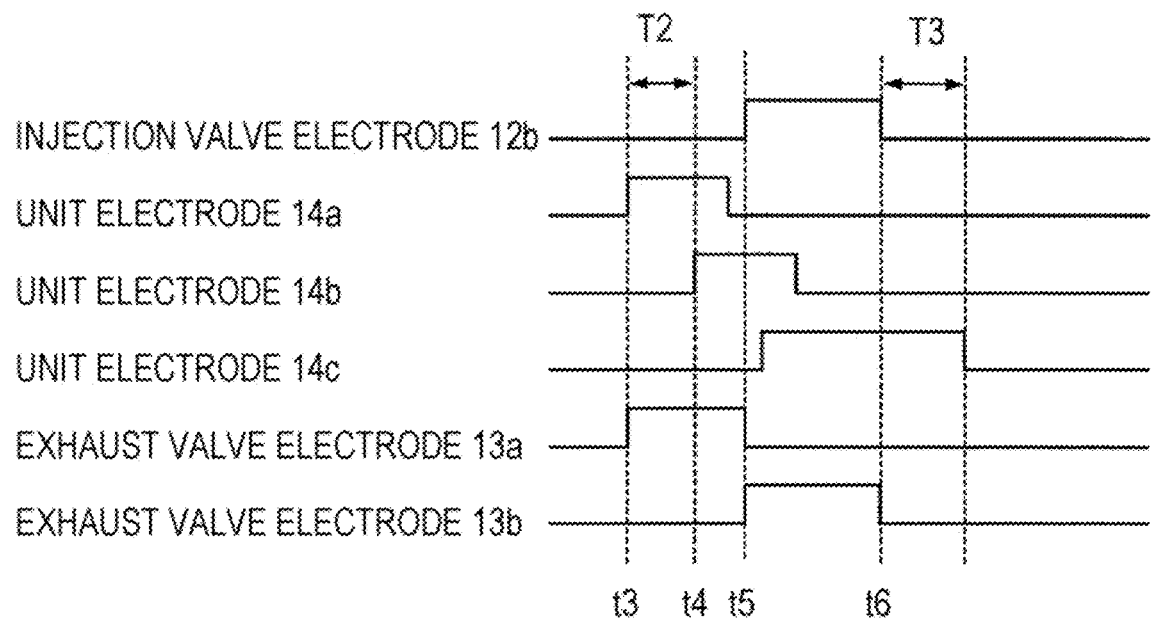
FIG. 10 is a diagram illustrating an example of timing for applying a desired control signal to a unit electrode 14, the injection valve electrode pair 12, and the exhaust valve electrode pair 13 for controlling the drive of the droplet 42.

FIG. 10 is a diagram illustrating an example of timing for applying a desired control signal to the unit electrode 14, the injection valve electrode pair 12, and the exhaust valve electrode pair 13 for controlling the drive of the droplet 42. FIGS. 11A to 11F are diagrams schematically illustrating a state in which the droplet 42 injected from the injection valve 51 moves in the gap 40 according to the drive voltage.

Figure 11A:
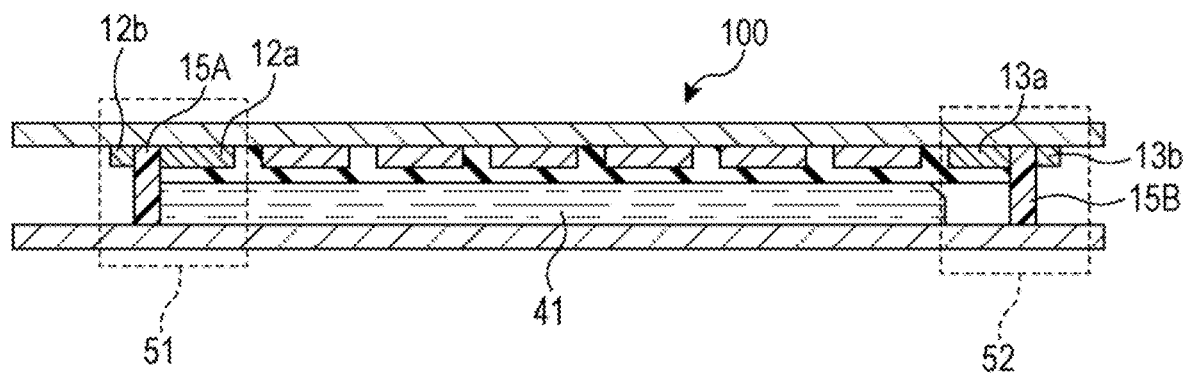
FIG. 11A is a diagram schematically illustrating a state in which the droplet 42 injected from the injection valve 51 moves in the gap 40 according to the drive voltage.

As illustrated in FIG. 11A, the gap 40 is filled with the oil 41 according to the timing chart illustrated in FIG. 10.

Figure 11B:
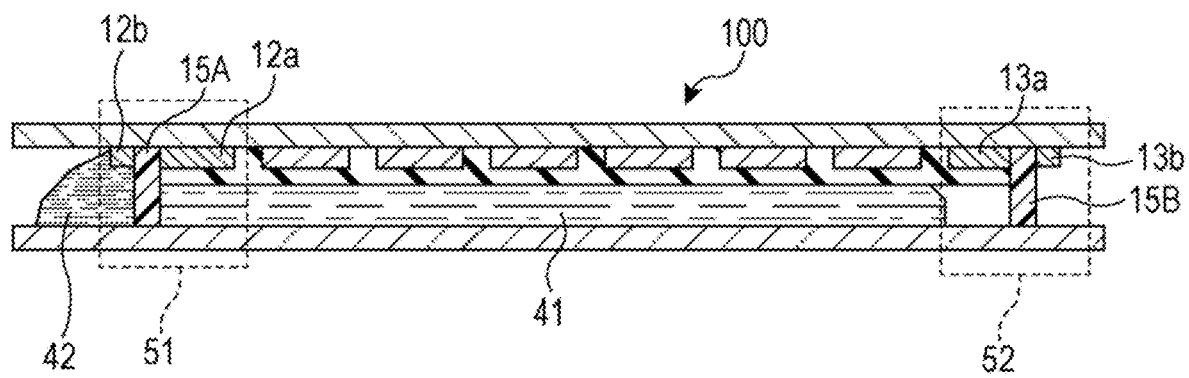
FIG. 11B is a diagram schematically illustrating a state in which the droplet 42 injected from the injection valve 51 moves in the gap 40 according to the drive voltage.

As illustrated in FIG. 11B, the droplet 42 is disposed at the inlet (near) of the injection valve 51 using, for example, a dropper (not illustrated).

Figure 11C:
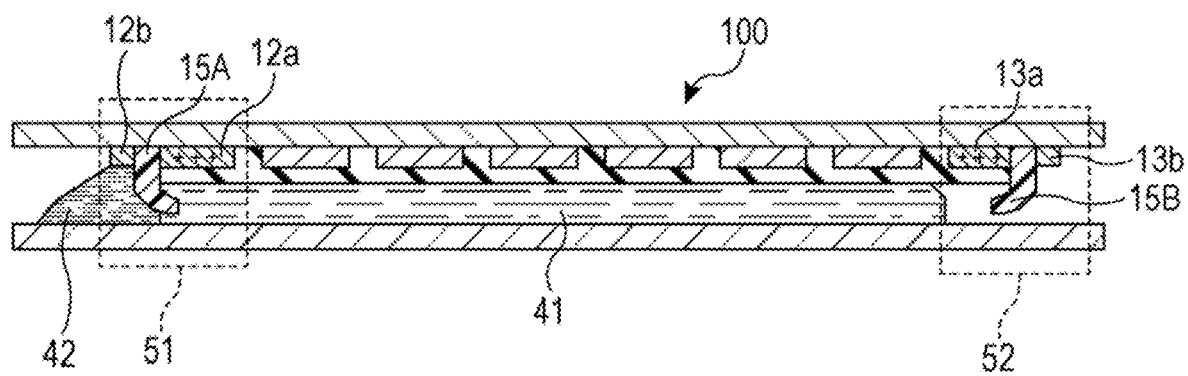
FIG. 11C is a diagram schematically illustrating a state in which the droplet 42 injected from the injection valve 51 moves in the gap 40 according to the drive voltage.

As illustrated in FIG. 11C, the injection valve 51 and the exhaust valve 52 are opened by applying a positive voltage to a unit electrode 14a and the exhaust valve electrode 13a at time t3. Here, the unit electrode 14a is an electrode common to the injection valve electrode 12a (see FIG. 11D). In a droplet injection period T2, the droplet 42 is injected into the gap 40 from the injection valve 51.

Figure 11D:
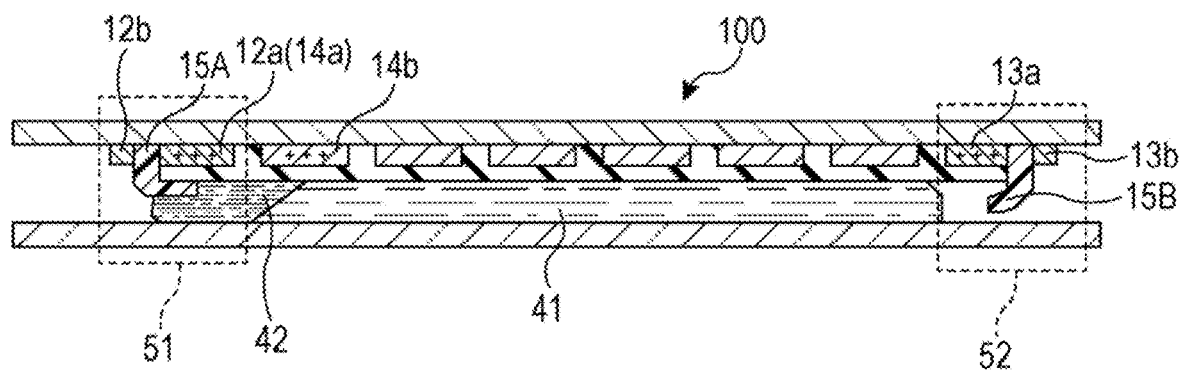
FIG. 11D is a diagram schematically illustrating a state in which the droplet 42 injected from the injection valve 51 moves in the gap 40 according to the drive voltage.

As illustrated in FIG. 11D, a positive driving voltage is applied to a unit electrode 14b at time t4 after the period T2 has elapsed from the time t3. During a predetermined period from the time t4, a positive voltage is applied to both the unit electrode 14a and the unit electrode 14b, and the droplet 42 is further guided inside.

At time t5, a positive voltage is applied to the injection valve electrode 12b and the exhaust valve electrode 13b. As a result, the injection valve 51 and the exhaust valve 52 are closed. At the time t5, a negative or zero voltage is applied to the unit electrode 14a and the exhaust valve electrode 13a, and a positive driving voltage is applied to the unit electrode 14b.

Figure 11E:
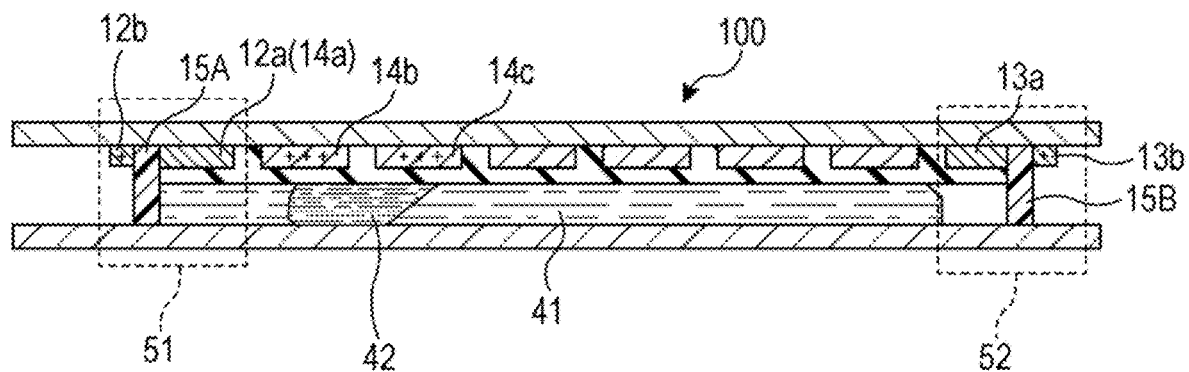
FIG. 11E is a diagram schematically illustrating a state in which the droplet 42 injected from the injection valve 51 moves in the gap 40 according to the drive voltage.

As illustrated in FIG. 11E, after a further elapse of time from the time t5, a positive driving voltage is applied to a unit electrode 14c. As a result, the droplet 42 is further guided inside.

Figure 11F:
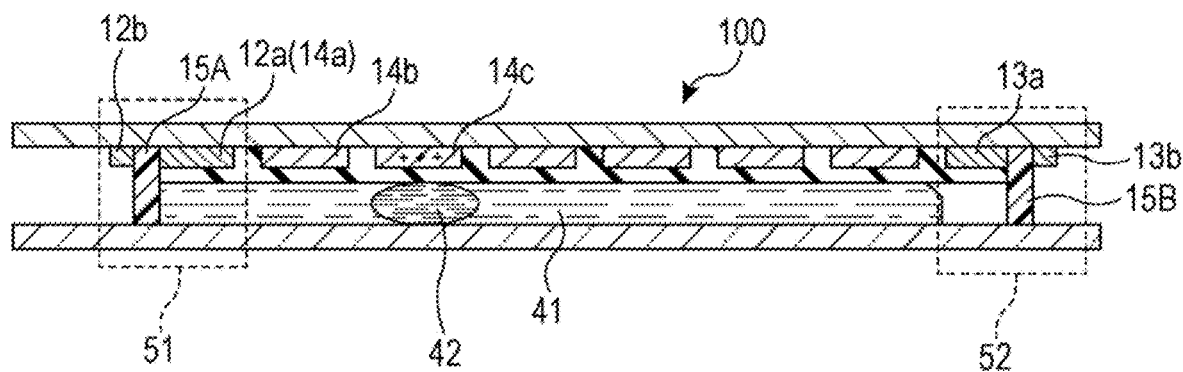
FIG. 11F is a diagram schematically illustrating a state in which the droplet 42 injected from the injection valve 51 moves in the gap 40 according to the drive voltage.

As illustrated in FIG. 11F, the supply of voltages to the injection valve electrode pair 12 and the exhaust valve electrode pair 13 is all stopped at time t6. By continuously supplying a positive voltage to the unit electrode 14c during a droplet holding period T3, the droplet 42 can be held at the position inside the unit electrode 14c during that period.

[2. Manufacturing Method of EWOD 100]

An example of a method for manufacturing the EWOD 100 according to the present embodiment will be described with reference to FIGS. 12A to 12F.

The manufacturing method according to the present embodiment includes a step of obtaining the electrode substrate 10, a step of obtaining the counter substrate 20, a step of drawing a sealing material in the sealing region 16A, a step of disposing the valve bodies 15A and 15B in the sealing region 16A, and a step of bonding both substrates.

FIGS. 12A to 12F are schematic cross-sectional views illustrating an example of a method for manufacturing the EWOD 100. FIGS. 12A to 12E illustrate cross-sectional structures when cut along the line AA' illustrated in FIG. 2.

Figure 12A:
FIG. 12A is a schematic cross-sectional view illustrating an example of a method for manufacturing the EWOD 100.

First, as illustrated in FIG. 12A, the substrate 11 is prepared.

Figure 12B:
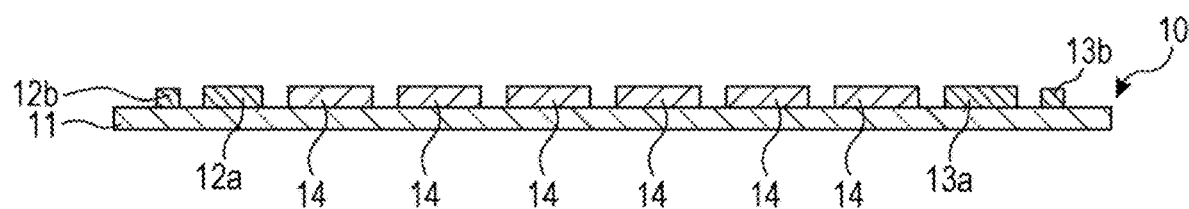
FIG. 12B is a schematic cross-sectional view illustrating an example of a method for manufacturing the EWOD 100.

Next, as illustrated in FIG. 12B, the injection valve electrode pair 12 including the injection valve electrodes 12a and 12b, the unit electrode 14, and the exhaust valve electrode pair 13 including the exhaust valve electrodes 13a and 13b are formed on the substrate 11. These electrodes are formed of a metal layer such as Cu or a transparent oxide conductive layer such as an IZO layer, an ITO layer, an InZnO layer, or a ZnO layer. The unit electrode 14 is formed by forming an IZO film having a thickness of 50 nm or more and 150 nm or less by a sputtering method, and then patterning the film by a photolithography process. In the step of forming the drive electrode region, the terminal electrode groups 18a, 18b, and 18c are formed together with the electrodes by patterning in a photolithography process on the outer peripheral region at the substrate 11.

Figure 12C:
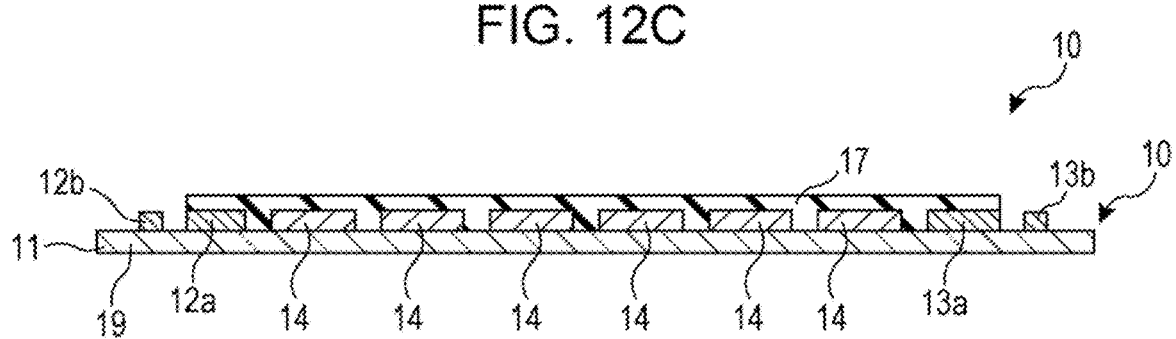
FIG. 12C is a schematic cross-sectional view illustrating an example of a method for manufacturing the EWOD 100.

Next, as illustrated in FIG. 12C, the water-repellent insulating layer 17 is formed to cover the injection valve electrode 12a of the injection valve electrode pair 12, the exhaust valve electrode 13a of the exhaust valve electrode pair 13, and the unit electrode 14. The water-repellent insulating layer 17 is, for example, a high dielectric layer.

The water-repellent insulating layer 17 may be a laminate having a dielectric layer and a water-repellent layer. The dielectric layer is formed of, for example, a SiN layer. For example, after forming a SiN layer of 100 nm or more and 500 nm or less, a water-repellent layer is formed on the SiN layer. The water-repellent layer is, for example, a fluorine-based resin layer having a thickness of 30 nm or more and 100 nm or less.

The fluorine-based resin is preferably one that chemically bonds to the surface of the oxide conductive layer, for example, one having a functional group at the terminal. Examples of the terminal functional group include —Si—(OR)n, —NH—Si—(OR)n, —CO—NH—Si—(OR)n, and —COOH (where n is 1 to 3). Further, a silane coupling agent or a fluorine-based primer may be used in combination. As the fluorine-based resin, for example, CYTOP (registered trademark) manufactured by AGC Inc. can be suitably used.

The fluorine-based resin layer is formed by a known method using a fluororesin solution (including a fluorine-based solvent). In order to remove the solvent and/or improve the stability of the fluorine-based resin, it is preferable to perform a heat treatment at, for example, about 170° C. to 200° C. Before forming the fluororesin layer, a silane coupling agent treatment or a fluorine-based primer treatment may be performed.

Through the above steps, the electrode substrate 10 is obtained.

Figure 12D:
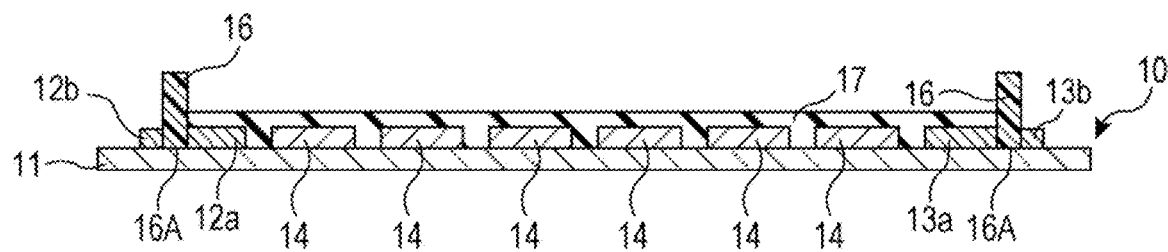
FIG. 12D is a schematic cross-sectional view illustrating an example of a method for manufacturing the EWOD 100.

Next, as illustrated in FIG. 12D, a sealing material is drawn on the sealing region 16A using a dispenser. When drawing the sealing material, a space is provided for disposing the valve bodies 15A and 15B in the sealing region 16A in a later step. The sealing material is, for example, a thermosetting resin (epoxy-based resin) or a photocurable resin. A mixture of a thermosetting resin and a spacer (for example, glass beads or plastic beads having a diameter of 200 μm to 300 μm) can be used as a sealing material.

Figure 12E:
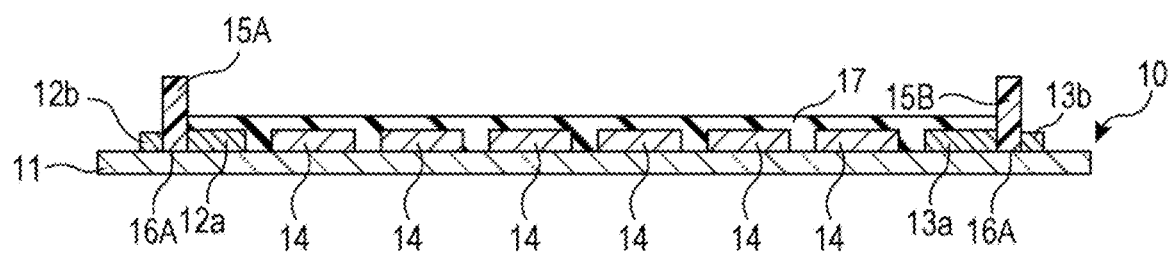
FIG. 12E is a schematic cross-sectional view illustrating an example of a method for manufacturing the EWOD 100.

Next, as illustrated in FIG. 12E, they are disposed in a space where the valve bodies 15A and 15B are disposed in the sealing region 16A.

The substrate 21 is prepared as the counter substrate 20. Alternatively, although not illustrated, for example, a counter electrode is formed on the substrate 21. The counter electrode is formed on almost the entire surface of the substrate 21. The counter electrode is formed of a transparent oxide conductive layer such as an ITO layer, an InZnO layer, or a ZnO layer. The thickness of the counter electrode is, for example, 50 nm or more and 150 nm or less, and is formed by a sputtering method. Thereafter, a water-repellent layer may be formed by forming a fluorine-based resin film having a thickness of 30 nm or more and 100 nm or less on the entire surface of the counter substrate 20.

Figure 12F:
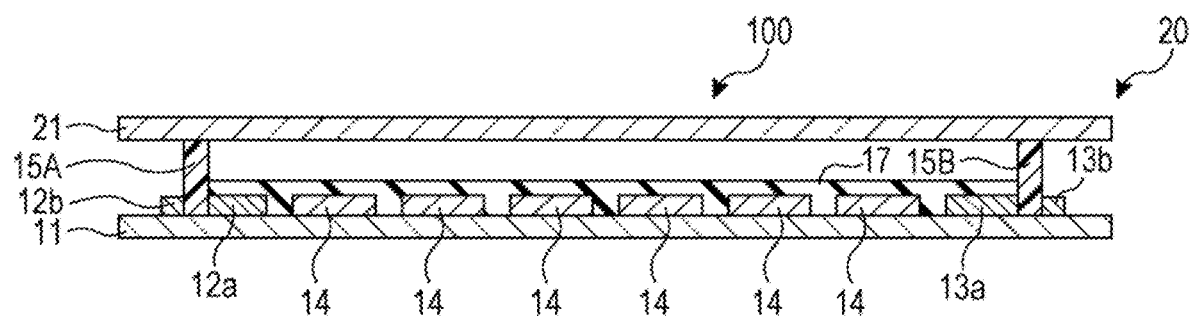
FIG. 12F is a schematic cross-sectional view illustrating an example of a method for manufacturing the EWOD 100.

Finally, as illustrated in FIG. 12F, the electrode substrate 10 and the counter substrate 20 are bonded together by using the sealing material drawn on the electrode substrate 10, and the sealing material is cured by, for example, heating. As a result, the electrode substrate 10 and the counter substrate 20 face each other, and the gap 40 is formed therebetween. Note that, when the counter electrode is provided on the counter substrate 20, a transfer (transition electrode) for connecting the counter electrode to a terminal on the electrode substrate 10 can be formed of, for example, a conductive paste in the bonding step.

Embodiment 2

The EWOD 100 according to the present embodiment is different from the EWOD 100 according to Embodiment 1 in that the injection valve electrode 12b of the injection valve electrode pair 12 and the exhaust valve electrode 13b of the exhaust valve electrode pair 13 are provided on the counter substrate 20. Hereinafter, description of the common points of the structure, operation, and manufacturing method of the EWOD 100 according to Embodiment 1 will be omitted, and those differences will be mainly described.

Figure 13:
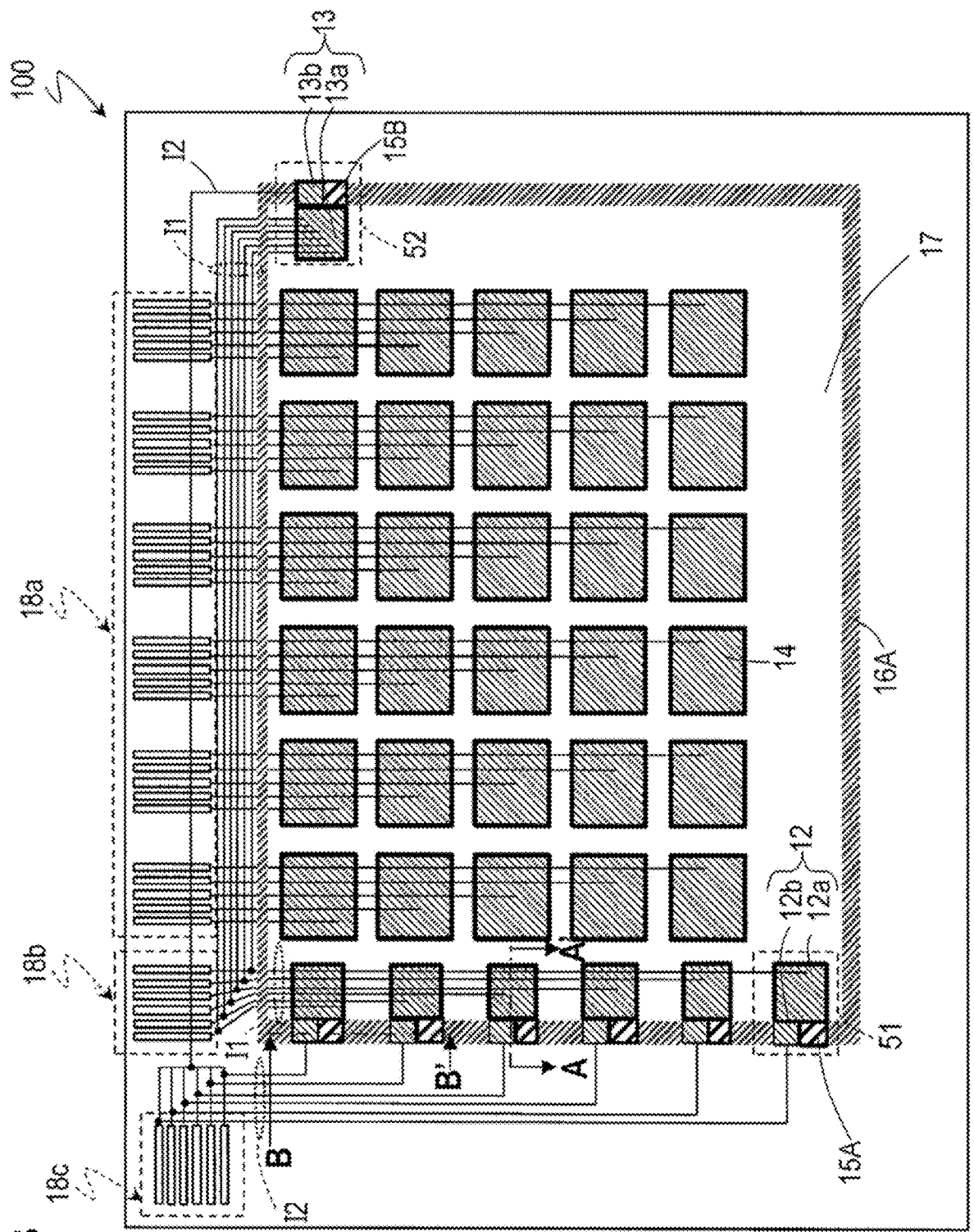
FIG. 13 is a plan view of the EWOD 100 when viewed from the direction normal to the substrate.
Figure 14:
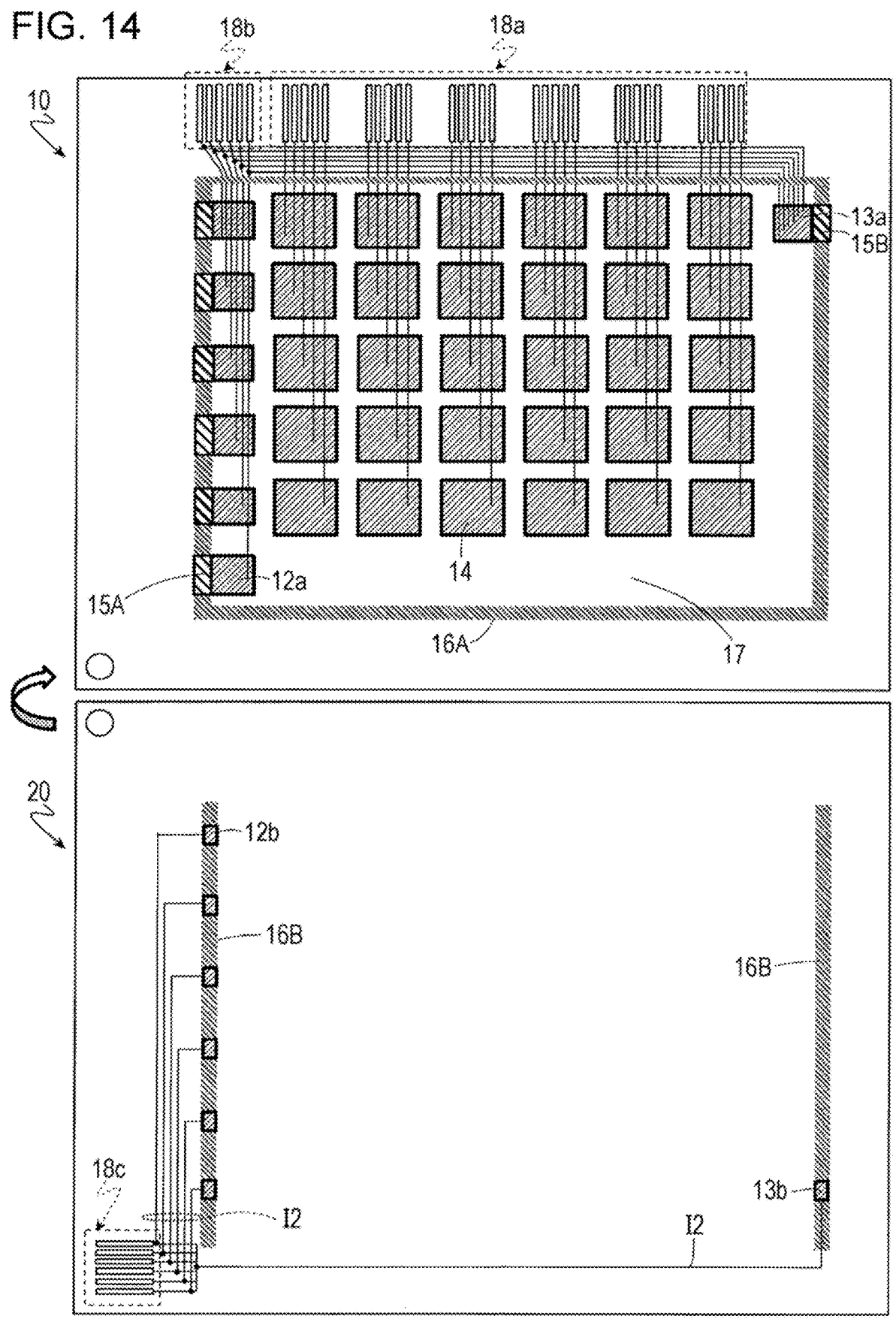
FIG. 14 is a plan view schematically illustrating an example of an electrode layout on the electrode substrate 10 (upper drawing) and an example of an electrode layout on a counter substrate 20 (lower drawing).
Figure 15A:
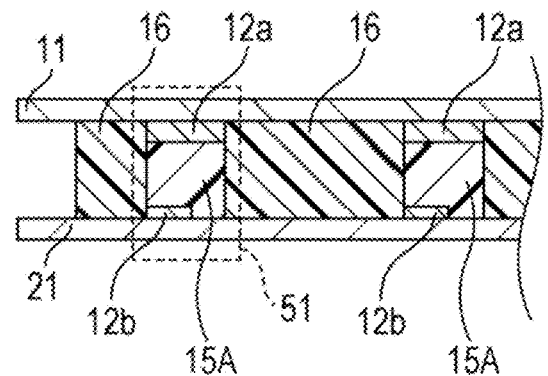
FIG. 15A is a cross-sectional view illustrating a cross-sectional structure B-B' of the EWOD 100 when cut along the line BB' illustrated in FIG. 13.
Figure 15B:
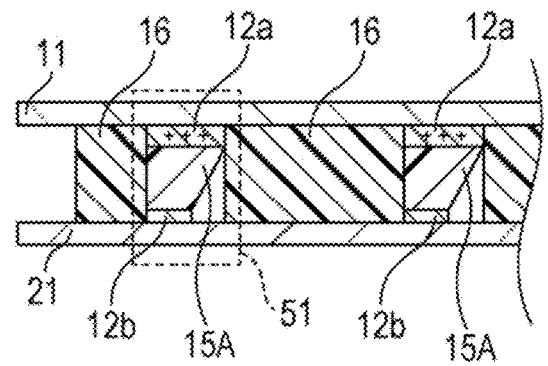
FIG. 15B is a cross-sectional view illustrating a cross-sectional structure B-B' of the EWOD 100 when cut along the line BB' illustrated in FIG. 13.
Figure 16A:
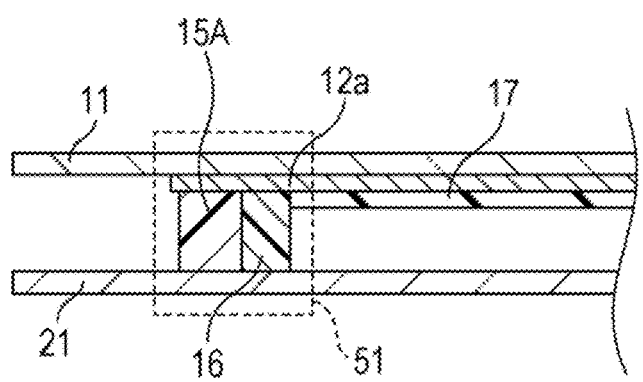
FIG. 16A is a cross-sectional view illustrating a cross-sectional structure A-A' of the EWOD 100 when cut along the line AA' illustrated in FIG. 13.
Figure 16B:
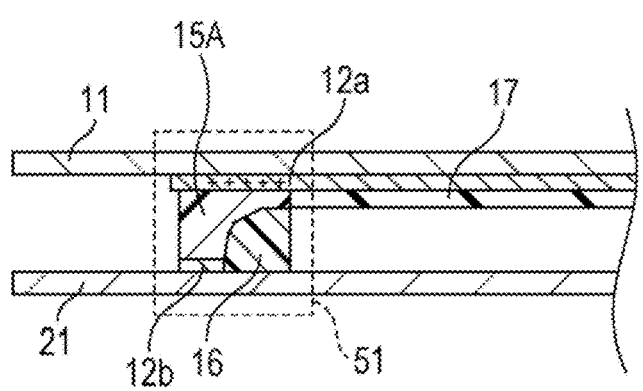
FIG. 16B is a cross-sectional view illustrating a cross-sectional structure A-A' of the EWOD 100 when cut along the line AA' illustrated in FIG. 13.

FIG. 13 is a plan view of the EWOD 100 according to the present embodiment when viewed from the direction normal to the substrate. FIG. 14 is a plan view schematically illustrating an example of an electrode layout on the electrode substrate 10 (upper drawing) and an example of an electrode layout on the counter substrate 20 (lower drawing). FIGS. 15A and 15B are cross-sectional views illustrating a cross-sectional structure B-B' of the EWOD 100 when cut along the line BB' illustrated in FIG. 13. FIGS. 16A and 16B are cross-sectional views illustrating a cross-sectional structure A-A' of the EWOD 100 when cut along the line AA' illustrated in FIG. 13. FIGS. 15A and 16A illustrate a state in which the valve body is closed, and FIGS. 15B and 16B illustrate a state in which the valve body is open.

The EWOD 100 includes a plurality of injection valves 51. The plurality of injection valves 51 are disposed along the side of the sealing region 16A extending in the column direction, and the sealing portion 16 (or a sealing material) is present between the first valve bodies 15A of two adjacent injection valves 51 of the plurality of injection valves 51. FIG. 13 illustrates an example in which six injection valves 51 are disposed in the EWOD 100 as in Embodiment 1. However, a single or two or more injection valves 51 may be disposed.

The injection valve electrode pair 12 includes the injection valve electrode 12a disposed on the electrode substrate 10 and the injection valve electrode 12b disposed on a sealing region 16B of the counter substrate 20. A part of the injection valve electrode 12a is located in the inner region at the electrode substrate 10, and the remaining part is located in the sealing region 16A. This is different from Embodiment 1 in which all the injection valve electrodes 12a are located in the inner region. In the direction normal to the substrate, the injection valve electrode 12a and the injection valve electrode 12b are disposed so as to partially sandwich the valve body 15A. As described above, the injection valve electrode pair 12 has a structure in which a part of the valve body 15A is sandwiched in the direction normal to the substrate.

The exhaust valve electrode pair 13 has an exhaust valve electrode 13a disposed on the electrode substrate 10 and an exhaust valve electrode 13b disposed on the sealing region 16B of the counter substrate 20. A part of the exhaust valve electrode 13a is located in the inner region at the electrode substrate 10, and the remaining part is located in the sealing region 16A. This is different from Embodiment 1 in which all of the exhaust valve electrodes 13a are located in the inner region. In the direction normal to the substrate, the exhaust valve electrode 13a and the exhaust valve electrode 13b are disposed so as to partially sandwich the valve body 15B of the exhaust valve 52. Similarly to the injection valve 51, the exhaust valve electrode pair 13 has a structure in which a part of the valve body 15B is sandwiched in the direction normal to the substrate.

The terminal electrode groups 18a and 18b are provided on the electrode substrate 10, and the terminal electrode group 18c is provided on the counter substrate 20. The injection valve electrode 12a of the injection valve 51 and the exhaust valve electrode 13a of the exhaust valve 52 are electrically connected in common to one corresponding terminal electrode of the terminal electrode group 18b via the wiring line I1. On the other hand, the injection valve electrode 12b of the injection valve 51 and the exhaust valve electrode 13b of the exhaust valve 52 are electrically connected in common to one corresponding terminal electrode of the terminal electrode group 18c via the wiring line I2 provided on the counter substrate 20.

In Embodiment 1, the valve body performs a one-dimensional operation according to ON/OFF of a drive voltage of the valve. The one-dimensional movement is, for example, an operation of bending the valve body 15A in one direction toward the inside of the gap 40 when a positive voltage is applied to the injection valve electrode 12a, and returning the valve body 15A to the original state when a positive voltage is applied to the injection valve electrode 12b.

In the present embodiment, the valve body performs a three-dimensional operation in accordance with ON/OFF of the valve drive voltage. The three-dimensional movement is an operation including a horizontal movement (see FIG. 16B) in which the valve body spreads along the electrode applying the positive voltage, and a vertical movement (see FIG. 15B) in which the valve body moves between the electrode applying the positive voltage and the electrode applying the negative electrode.

Figure 17A:
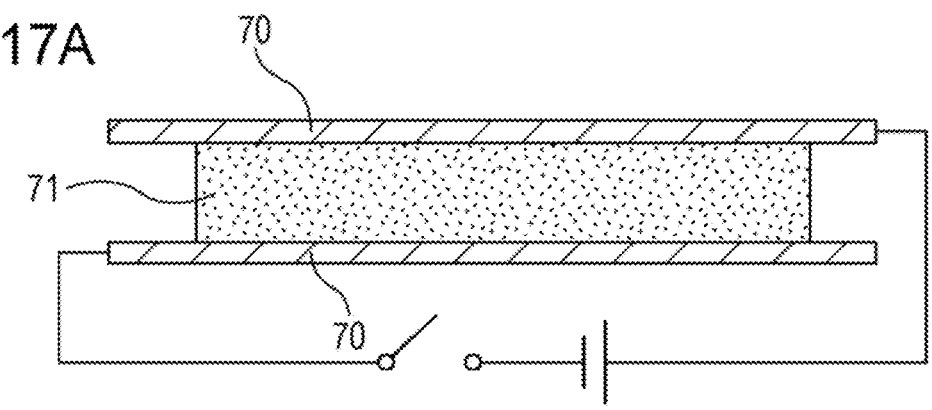
FIG. 17A is a diagram schematically illustrating a state of an electric field responsive gel 71 sandwiched between a plate-like electrode pair 70 when no voltage is applied.
Figure 17B:
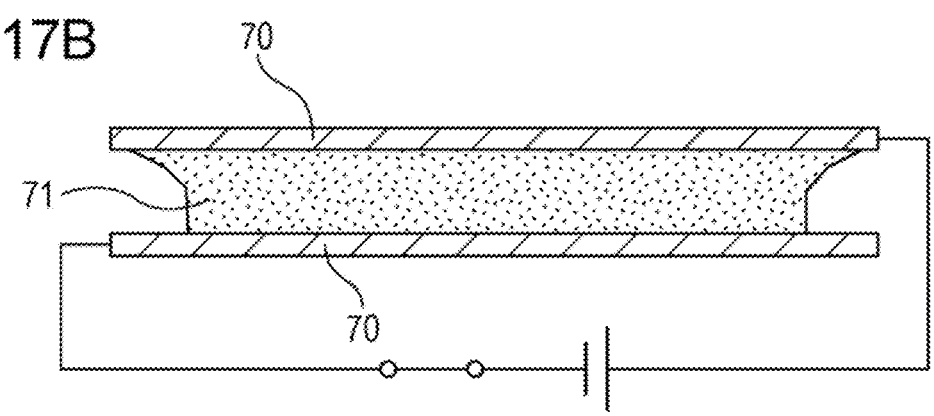
FIG. 17B is a diagram schematically illustrating a state of an electric field responsive gel 71 sandwiched between the plate-like electrode pair 70 when a voltage is applied.

With reference to FIGS. 17A and 17B, the creep deformation of the electric field responsive gel will be described in more detail.

FIG. 17A is a diagram schematically illustrating a state of an electric field responsive gel 71 sandwiched between a plate-like electrode pair 70 when no voltage is applied. FIG. 17B is a diagram schematically illustrating a state of an electric field responsive gel 71 sandwiched between the plate-like electrode pair 70 when a voltage is applied.

When a voltage is applied to the electric field responsive gel 71 in a state where the electric field responsive gel 71 is sandwiched between the plate-like electrode pair 70 having no elasticity, the electric field responsiveness of the gel may be obtained. When a voltage is applied between the electrode pair 70, electrons are injected from the cathode into the gel, and the injected electrons move toward the anode. Therefore, electrons are accumulated on the anode side. The accumulation of charge causes an electrostatic adsorption action on the anode surface, and the gel undergoes creep deformation near the anode. As a result, the gel spreads like a tail at the contact surface in contact with the anode. When the voltage applied between the electrode pair 70 is removed, the electrostatic force disappears and the gel returns to its original state by elasticity.

Figure 18:
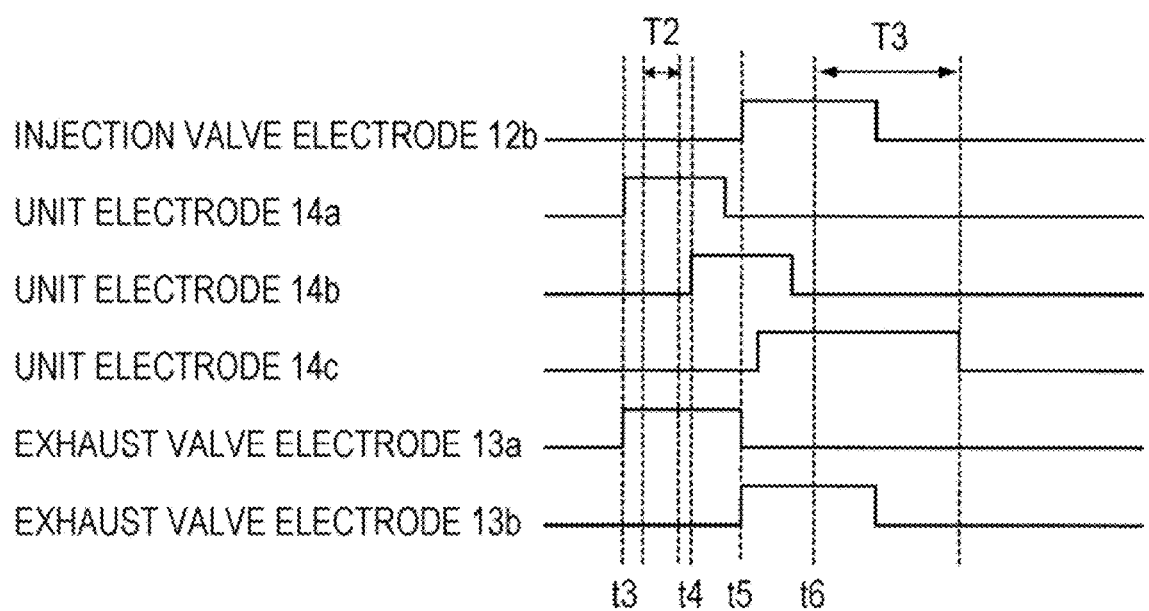
FIG. 18 is a diagram illustrating an example of timing for applying a desired control signal to the injection valve electrode pair 12, the exhaust valve electrode pair 13, and the unit electrode 14 for controlling the drive of the droplet 42.

With reference to FIG. 18, a method of controlling an electrode for injecting and driving the droplet 42 into the gap 40 filled with the oil 41 will be described.

FIG. 18 is a diagram illustrating an example of timing for applying a desired control signal to the injection valve electrode pair 12, the exhaust valve electrode pair 13, and the unit electrode 14 for controlling the drive of the droplet 42.

The method of controlling the gel is basically as described in Embodiment 1. However, since the creep phenomenon is used, the response speed and the drive voltage are slightly different from those of Embodiment 1.

For example, at time t3, a positive voltage is supplied to the unit electrode 14a (injection valve electrode 12a) and the exhaust valve electrode 13a to open the injection valve 51 and the exhaust valve 52, and after the droplet injection period T2 has elapsed, a positive voltage is applied to the unit electrode 14b at time t4. At time t5, a positive voltage is applied to the injection valve electrode 12b, a positive voltage is applied to the exhaust valve electrode 13b, and a negative or zero voltage is applied to the exhaust valve electrode 13a. Thus, at time t5, the injection valve 51 and the exhaust valve 52 start the closing operation. After the injection valve 51 and the exhaust valve 52 are completely closed at time t6, by continuously supplying a positive voltage to the unit electrode 14c during the droplet holding period T3, the droplet 42 can be held at the position of the internal unit electrode 14c during the period.

According to the configuration of the EWOD of the present embodiment, it is possible to increase the degree of freedom in designing by adjusting the distance between the electrode substrate 10 and the counter substrate 20, that is, the distance between the electrodes of the injection valve electrode pair 12 and the exhaust valve electrode pair 13 in the direction normal to the substrate. For example, there is an advantage that the drive voltage can be reduced. Further, as described above, the counter substrate 20 may further include a water-repellent insulating layer. In that case, according to the configuration of the present embodiment in which the electrode pair is present in the direction normal to the substrate, it is possible to appropriately suppress the rubbing that may occur between the valve body and the water-repellent insulating layer due to the opening/closing operation of the valve body.

Figure 19A:
FIG. 19A is a schematic cross-sectional view illustrating an example of a method for manufacturing an electrode substrate 10 included in the EWOD 100.
Figure 19B:
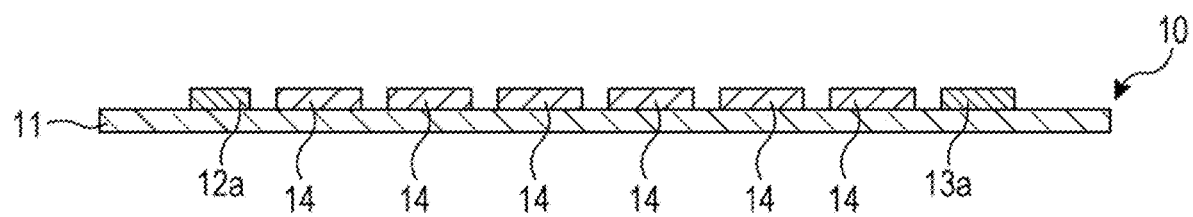
FIG. 19B is a schematic cross-sectional view illustrating an example of a method for manufacturing the electrode substrate 10 included in the EWOD 100.
Figure 19C:
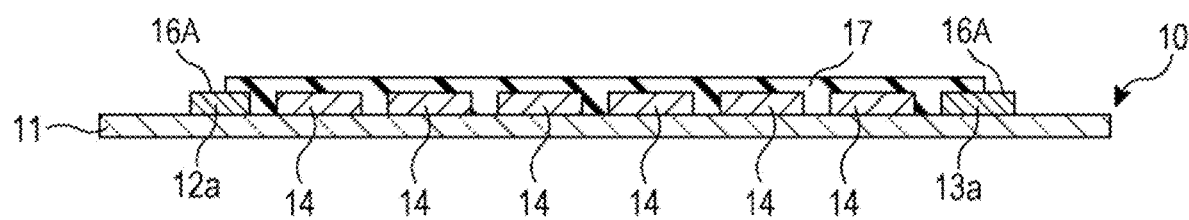
FIG. 19C is a schematic cross-sectional view illustrating an example of a method for manufacturing the electrode substrate 10 included in the EWOD 100.

FIGS. 19A to 19C are schematic cross-sectional views illustrating an example of a method for manufacturing the electrode substrate 10 included in the EWOD 100.

First, as illustrated in FIG. 19A, a substrate 11 is prepared.

Next, as illustrated in FIG. 19B, on the substrate 11, the injection valve electrode 12a of the injection valve electrode pair 12, the exhaust valve electrode 13a of the exhaust valve electrode pair 13, the unit electrode 14, and the terminal electrode groups 18a and 18b are formed.

Next, as illustrated in FIG. 19C, a water-repellent insulating layer 17 is formed so as to cover the injection valve electrode 12a, the exhaust valve electrode 13a, and the unit electrode 14. At this time, the sealing region 16A to which the sealing material is applied and the terminal electrode groups 18a and 18b are exposed by patterning in a photolithography process. Further, in consideration of the creep deformation of the gel, a gap illustrated in FIG. 16A may be provided between the valve body 15A and the water-repellent insulating layer 17 and between the valve body 15B and the water-repellent insulating layer 17. It is preferable to provide a gap that can be completely covered when the valve body undergoes creep deformation. This can prevent the droplet 42 from directly coming into contact with the electrode. Alternatively, a thin protection film may be formed on at least the electrode located in the gap.

Through the above steps, the electrode substrate 10 is obtained.

Figure 20A:
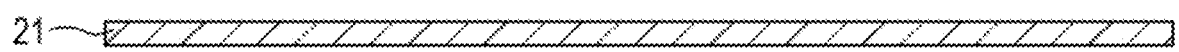
FIG. 20A is a schematic cross-sectional view illustrating an example of a method for manufacturing a counter substrate 20 included in the EWOD 100.
Figure 20B:
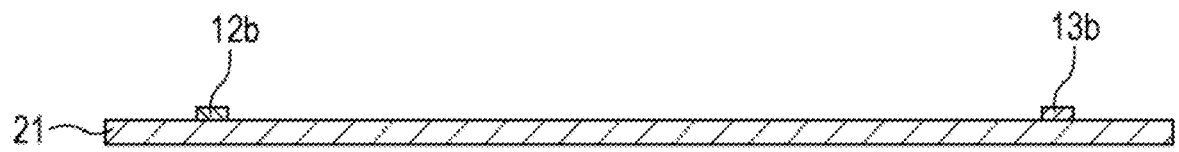
FIG. 20B is a schematic cross-sectional view illustrating an example of a method for manufacturing a counter substrate 20 included in the EWOD 100.

FIGS. 20A and 20B are schematic cross-sectional views illustrating an example of a method for manufacturing a counter substrate 20 included in the EWOD 100.

First, as illustrated in FIG. 20A, a substrate 21 is prepared.

Next, as illustrated in FIG. 20B, the injection valve electrode 12b of the injection valve electrode pair 12 and the exhaust valve electrode 13b of the exhaust valve electrode pair 13 are formed in the sealing region at the counter substrate 20, and the terminal electrode group 18c is formed in the external region. When bonding both substrates, the injection valve electrode 12b is disposed so as to face the injection valve electrode 12a with the valve body 15A therebetween. Similarly, the exhaust valve electrode 13b is disposed to face the exhaust valve electrode 13a with the valve body 15B therebetween. Note that, similarly to Embodiment 1, it is possible to further form a counter electrode on the substrate 21 and cover the counter electrode with a water-repellent layer. In that case, the injection valve electrode 12b, the exhaust valve electrode 13b, and the terminal electrode group 18c are exposed by patterning in a photolithography process.

Through the above steps, the counter substrate 20 is obtained.

Figure 21A:
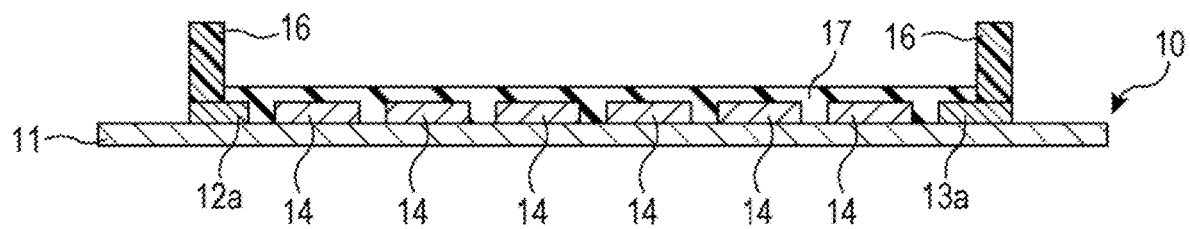
FIG. 21A is a schematic cross-sectional view illustrating a step of bonding the electrode substrate 10 and the counter substrate 20.
Figure 21B:
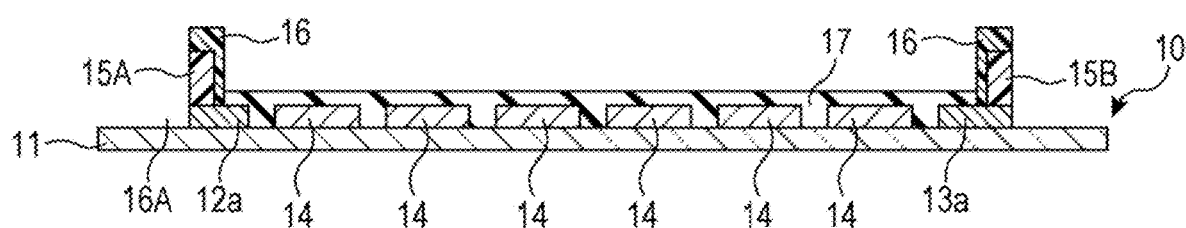
FIG. 21B is a schematic cross-sectional view illustrating a step of bonding the electrode substrate 10 and the counter substrate 20.
Figure 21C:
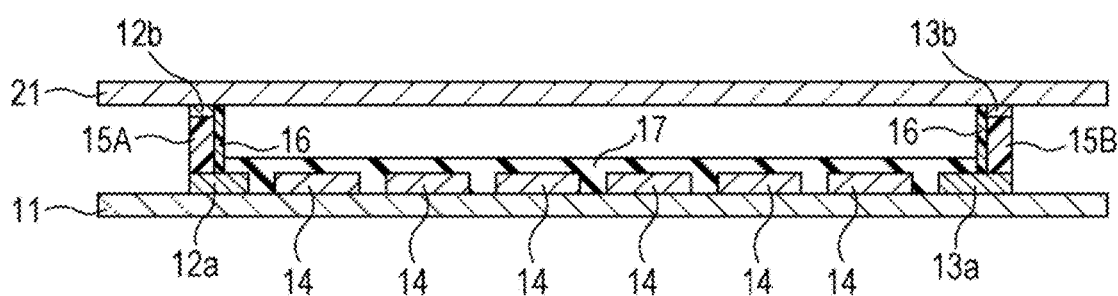
FIG. 21C is a schematic cross-sectional view illustrating a step of bonding the electrode substrate 10 and the counter substrate 20.

FIGS. 21A to 21C are schematic cross-sectional views illustrating a step of bonding the electrode substrate 10 and the counter substrate 20.

As illustrated in FIG. 21A, a sealing material is drawn on the sealing region 16A using a dispenser. At this time, a space for disposing the valve bodies 15A and 15B in the sealing region 16A in a later step is left.

Next, as illustrated in FIG. 21B, they are arranged in a space where the valve bodies 15A and 15B are disposed in the sealing region 16A. When bonding both substrates, the alignment marks (not illustrated) of the electrode substrate 10 and the counter substrate 20 are aligned so that the injection valve electrode pair 12 partially sandwiches the valve body 15A in the injection valve 51 and the exhaust valve electrode pair 13 partially sandwiches the valve body 15B in the exhaust valve 52.

Finally, as illustrated in FIG. 21C, the electrode substrate 10 and the counter substrate 20 are bonded together by using a sealing material drawn on the electrode substrate 10, and the sealing material is cured by, for example, heating.

An EWOD 100 according to a modification example of the present embodiment will be described with reference to FIGS. 22 to 25B.

Figure 22:
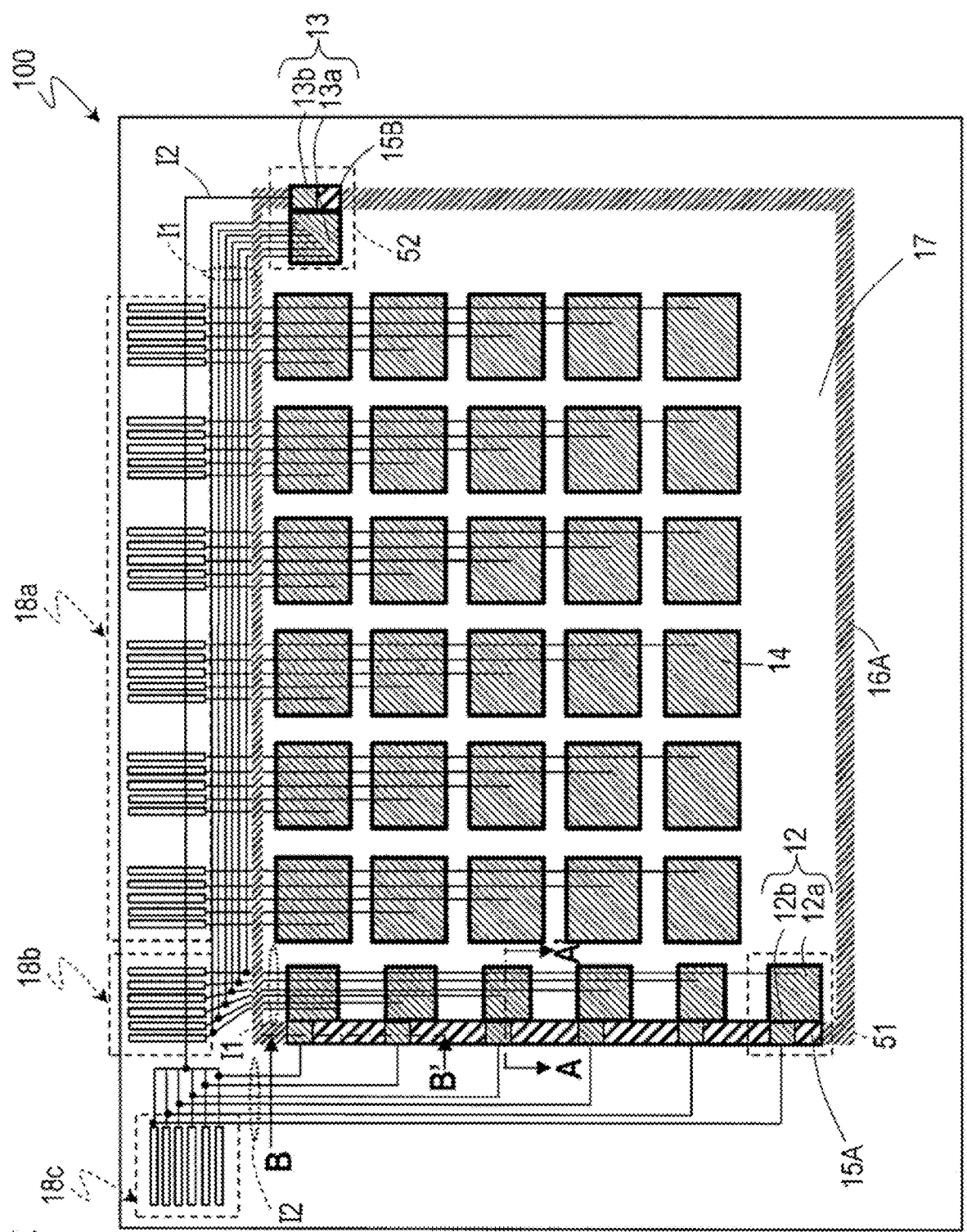
FIG. 22 is a plan view of the EWOD 100 according to a modification example of Embodiment 2 when viewed from the direction normal to the substrate.
Figure 23:
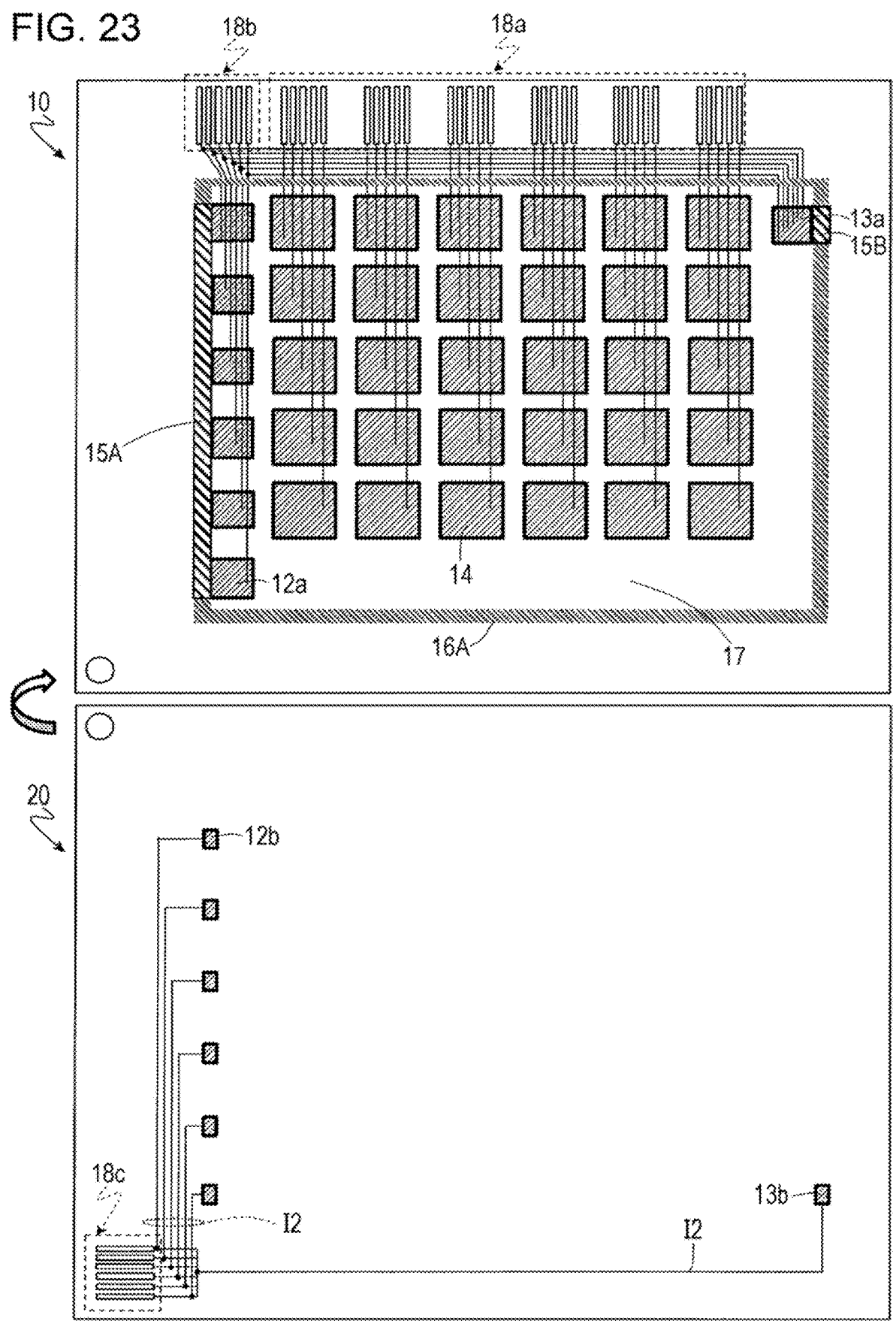
FIG. 23 is a plan view schematically illustrating an example of an electrode layout on the electrode substrate 10 (upper drawing) and an example of an electrode layout on a counter substrate 20 (lower drawing).
Figure 24A:
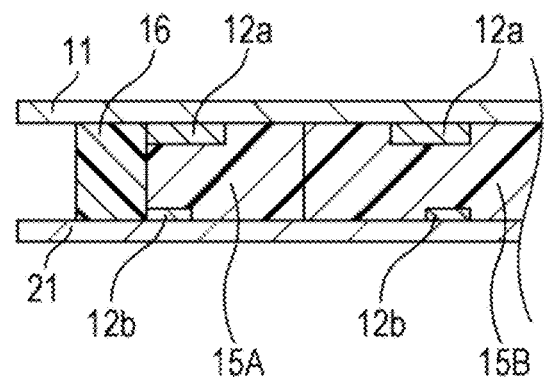
FIG. 24A is a cross-sectional view illustrating a cross-sectional structure B-B' of the EWOD 100 when cut along the line BB' illustrated in FIG. 22.
Figure 24B:
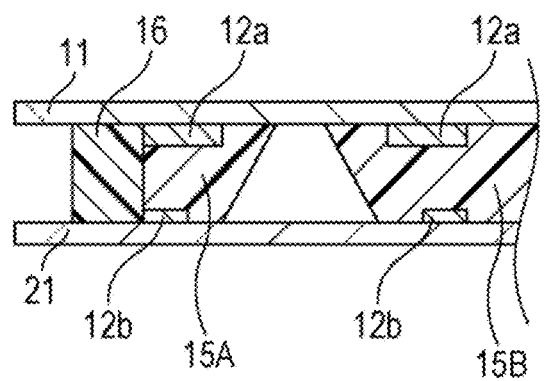
FIG. 24B is a cross-sectional view illustrating a cross-sectional structure B-B' of the EWOD 100 when cut along the line BB' illustrated in FIG. 22.
Figure 25A:
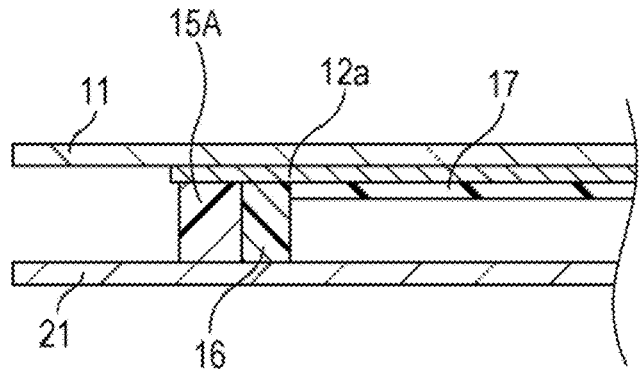
FIG. 25A is a cross-sectional view illustrating a cross-sectional structure A-A' of the EWOD 100 when cut along the line AA' illustrated in FIG. 22.
Figure 25B:
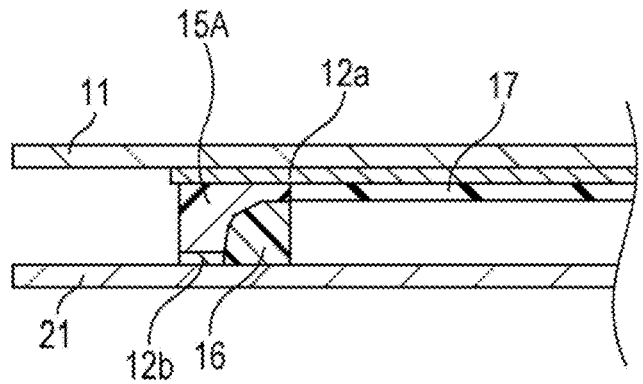
FIG. 25B is a cross-sectional view illustrating a cross-sectional structure A-A' of the EWOD 100 when cut along the line AA' illustrated in FIG. 22.

FIG. 22 is a plan view of the EWOD 100 according to a modification example of the present embodiment, as viewed from the direction normal to the substrate. FIG. 23 is a plan view schematically illustrating an example of an electrode layout on the electrode substrate 10 (upper drawing) and an example of an electrode layout on a counter substrate 20 (lower drawing). FIGS. 24A and 24B are cross-sectional views illustrating a cross-sectional structure B-B' of the EWOD 100 when cut along the line BB' illustrated in FIG. 22. FIGS. 25A and 25B are cross-sectional views illustrating a cross-sectional structure A-A' of the EWOD 100 when cut along the line AA' illustrated in FIG. 22. FIGS. 24A and 25A illustrate a state where the valve body 15 is closed, and FIGS. 24B and 25B illustrate a state where the valve body 15 is open.

In the modification example, a plurality of valve bodies 15A of a plurality of injection valves 51 are continuously disposed in the sealing region 16A. The valve bodies 15 of two adjacent injection valves 51 of the plurality of injection valves 51 are in contact with each other when the injection valves 51 are closed. In other words, as illustrated in FIG. 24A, the sealing portion 16 is not present between the valve bodies 15A of the two adjacent injection valves 51.

According to the configuration of the EWOD according to the modification example of the present embodiment, it is not necessary to dispose the valve body and the sealing portion alternately, and since the valve body can be disposed continuously, there is an advantage that the accuracy when bonding the electrode substrate 10 and the counter substrate 20 can be suppressed lower than the accuracy required for the EWOD according to the present embodiment.

Embodiments of the present invention can be widely applied to electrowetting devices. The electrowetting device according to the embodiment of the present invention is suitably used for, for example, a device that performs a bioanalysis such as a gene analysis or a chemical reaction.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An electrowetting device comprising:
    an electrode substrate including a first substrate, a plurality of first drive electrodes formed on the first substrate, and a water-repellent insulating layer formed on the plurality of first drive electrodes;
    a counter substrate including a second substrate, and disposed so as to face the electrode substrate with a predetermined gap therebetween;
    a sealing portion provided in a sealing region at the electrode substrate, and bonding the electrode substrate and the counter substrate; and
    at least one injection valve for injecting a droplet into the gap, the injection valve being located in the sealing region and including a first valve body formed of an electric field responsive gel.

2. The electrowetting device according to claim 1, wherein
    the injection valve includes the first valve body and an injection valve electrode pair for sandwiching at least a part of the first valve body and applying a voltage to the first valve body, and
    the injection valve electrode pair includes a first injection valve electrode wholly or partially located in an inner region inside the sealing region at the electrode substrate.

3. The electrowetting device according to claim 1, further comprising
    an exhaust valve for taking out air in the gap, the exhaust valve being located in the sealing region, and including a second valve body formed of an electric field responsive gel.

4. The electrowetting device according to claim 3, wherein
    the exhaust valve includes the second valve body and an exhaust valve electrode pair for sandwiching at least a part of the second valve body and applying a voltage to the second valve body,
    the exhaust valve electrode pair includes a first exhaust valve electrode wholly or partially located in an inner region inside the sealing region, and
    a first injection valve electrode and the first exhaust valve electrode are electrically connected to a first terminal electrode via a first wiring line.

5. The electrowetting device according to claim 4, wherein
    the electrode substrate further includes the first terminal electrode for externally supplying a desired control signal for controlling opening/closing of the injection valve and the exhaust valve, and
    the first injection valve electrode and the first exhaust valve electrode are electrically connected to the first terminal electrode via the first wiring line.

6. The electrowetting device according to claim 4, wherein
    the electrode substrate further includes a second terminal electrode different from the first terminal electrode, for externally supplying a desired control signal for controlling opening/closing of the injection valve and the exhaust valve,
    an injection valve electrode pair includes the first injection valve electrode and a second injection valve electrode located in an outer region outside the sealing region at the electrode substrate, and the first injection valve electrode and the second injection valve electrode sandwich a part of the first valve body,
    the exhaust valve electrode pair includes the first exhaust valve electrode and a second exhaust valve electrode located in the outer region, and the first exhaust valve electrode and the second exhaust valve electrode sandwich a part of the second valve body, and
    the second injection valve electrode and the second exhaust valve electrode are electrically connected to the second terminal electrode via a second wiring line.

7. The electrowetting device according to claim 4, wherein
    the counter substrate further includes a second terminal electrode different from the first terminal electrode, for externally supplying a desired control signal for controlling opening/closing of the injection valve and the exhaust valve,
    an injection valve electrode pair includes the first injection valve electrode and a second injection valve electrode located in a sealing region at the counter substrate, and in a direction normal to the electrode substrate, the first injection valve electrode and the second injection valve electrode sandwich a part of the first valve body,
    the exhaust valve electrode pair includes the first exhaust valve electrode and a second exhaust valve electrode located in the sealing region at the counter substrate, and in the direction normal to the electrode substrate, the first exhaust valve electrode and the second exhaust valve electrode sandwich a part of the second valve body, and
    the second injection valve electrode and the second exhaust valve electrode are electrically connected to the second terminal electrode via a second wiring line.

8. The electrowetting device according to claim 6, wherein
    the at least one injection valve includes a plurality of injection valves, and
    the plurality of injection valves are disposed along a column direction, and a part of the sealing portion is present between the first valve bodies of two of the plurality of injection valves adjacent to each other.

9. The electrowetting device according to claim 7, wherein
    the at least one injection valve includes a plurality of injection valves, and
    the plurality of injection valves are disposed along a column direction, and the first valve bodies of two of the plurality of injection valves adjacent to each other are in contact with each other when the injection valves are closed.

10. The electrowetting device according to claim 4,
wherein each of the first valve body and the second valve body is formed of a polyvinyl chloride gel.

11. The electrowetting device according to claim 4,
wherein an area of a second injection valve electrode is smaller than an area of the first injection valve electrode, and an area of a second exhaust valve electrode is smaller than an area of the first exhaust valve electrode.

12. The electrowetting device according to claim 4, wherein
the injection valve is opened by applying a positive voltage to the first injection valve electrode of an injection valve electrode pair and applying a negative or zero voltage to a second injection valve electrode of the injection valve electrode pair, and the injection valve is closed by applying a negative or zero voltage to the first injection valve electrode and applying a positive voltage to the second injection valve electrode, and
the exhaust valve is opened by applying a positive voltage to the first exhaust valve electrode of the exhaust valve electrode pair and applying a negative or zero voltage to a second exhaust valve electrode, and the exhaust valve is closed by applying a negative or zero voltage to the first exhaust valve electrode and applying a positive voltage to the second injection valve electrode.

13. The electrowetting device according to claim 1,
wherein the injection valve includes an injection valve electrode for applying a voltage to the first valve body, the injection valve electrode being wholly or partially located in an inner region inside the sealing region at the electrode substrate.

14. The electrowetting device according to claim 13, further comprising
an exhaust valve for taking out air in the gap, the exhaust valve being located in the sealing region, and including a second valve body formed of an electric field responsive gel,
wherein the exhaust valve includes an exhaust valve electrode for applying a voltage to the second valve body, the exhaust valve electrode being wholly or partially located in the inner region.

15. The electrowetting device according to claim 1,
wherein the counter substrate further includes a plurality of second drive electrodes formed on the second substrate and a second water-repellent insulating layer formed on the second drive electrodes.

16. The electrowetting device according to claim 1,
wherein the plurality of first drive electrodes are passive matrix electrodes arranged in rows and columns.

* * * * *